(12) United States Patent
Yamauchi et al.

(10) Patent No.: US 7,900,958 B2
(45) Date of Patent: Mar. 8, 2011

(54) AIRBAG APPARATUS FOR A FRONT PASSENGER'S SEAT

(75) Inventors: Koji Yamauchi, Aichi-ken (JP); Tsuyoshi Furuno, Aichi-ken (JP); Yasushi Okada, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 233 days.

(21) Appl. No.: 12/320,459

(22) Filed: Jan. 27, 2009

(65) Prior Publication Data

US 2009/0194982 A1 Aug. 6, 2009

(30) Foreign Application Priority Data

Jan. 31, 2008 (JP) ................... 2008-021866

(51) Int. Cl.
*B60R 21/205* (2006.01)
(52) U.S. Cl. .................... 280/732; 280/743.1
(58) Field of Classification Search .............. 280/732, 280/743.1, 728.2, 742
See application file for complete search history.

(56) References Cited

U.S. PATENT DOCUMENTS

| | | | | |
|---|---|---|---|---|
| 5,873,598 A | * | 2/1999 | Yoshioka et al. | 280/740 |
| 5,944,344 A | * | 8/1999 | Yoshioka et al. | 280/740 |
| 6,029,996 A | * | 2/2000 | Yoshioka et al. | 280/740 |
| 6,692,024 B2 | * | 2/2004 | Fischer et al. | 280/743.1 |
| 7,083,186 B2 | * | 8/2006 | Lutz et al. | 280/728.3 |
| 2010/0045006 A1 | * | 2/2010 | Thomas | 280/732 |

FOREIGN PATENT DOCUMENTS

JP A-10-194065 7/1998

* cited by examiner

*Primary Examiner* — Paul N Dickson
*Assistant Examiner* — Drew Brown
(74) *Attorney, Agent, or Firm* — Posz Law Group, PLC

(57) ABSTRACT

An airbag apparatus for a front passenger's seat includes a case that includes a front storage area that has an airbag mounting plane and a rear storage area. A bottom wall of the rear storage area is located at a lower level than the airbag mounting plane of the front storage area. The airbag has a generally square conical contour whose top is disposed at the front end and includes proximate the front end a gas inlet port. The airbag is secured to the mounting plane of the case by the periphery of the gas inlet port. A lower folded-up portion that is formed by folding up a lower inflatable portion of the airbag is stored in the rear storage area of the case. The airbag apparatus further includes proximate left and right edges of an opening of the case in the rear storage area means for restraining emergence of the lower folded-up portion of the airbag from the opening of the case in an early stage of airbag deployment by holding down left and right end regions of the lower folded-up portion.

7 Claims, 26 Drawing Sheets

Fig.16A
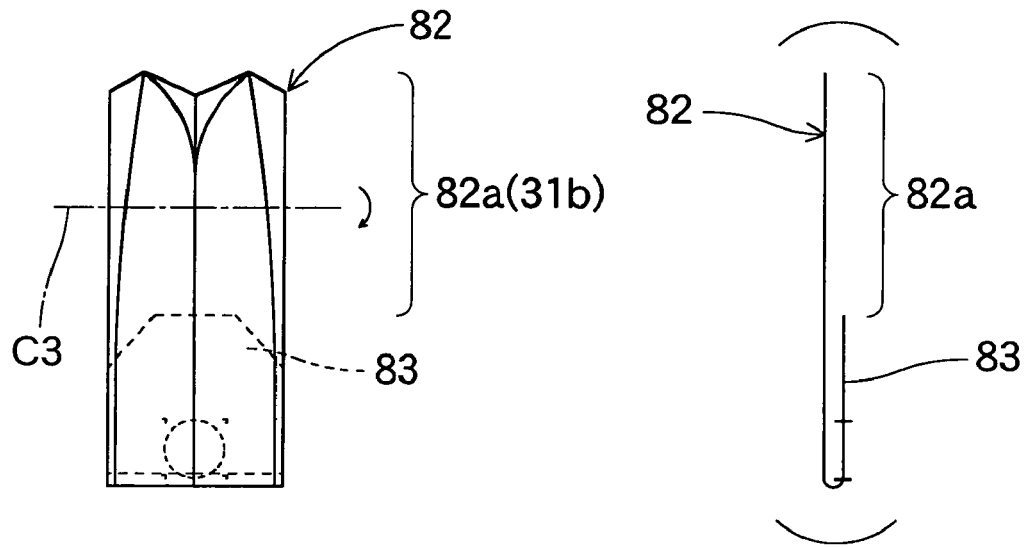
Fig.16B
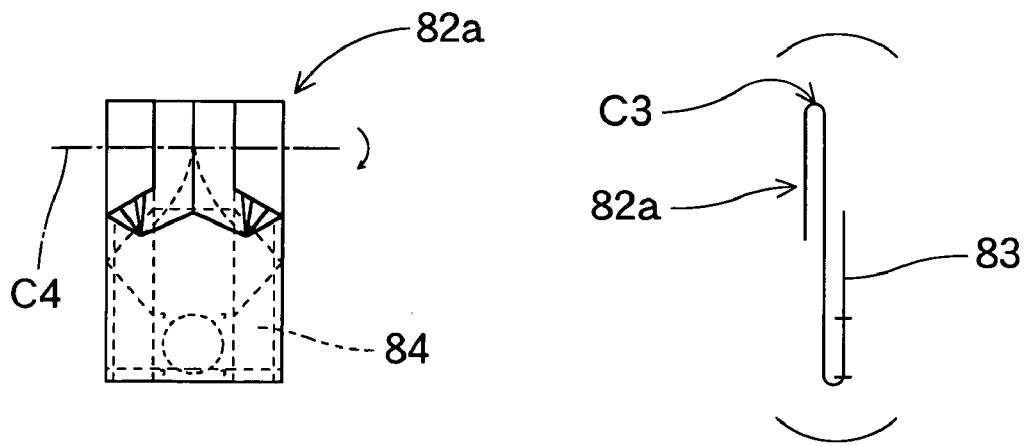

⇩

AIRBAG APPARATUS FOR A FRONT PASSENGER'S SEAT

The present application claims priority from Japanese Patent Application No. 2008-021866 of Yamauchi et al., filed on Jan. 31, 2008, the disclosure of which is hereby incorporated into the present application by reference.

BACKGROUND OF THE INVENTION

1. Field of the Invention

The present invention relates to an airbag apparatus for a front passenger's seat mounted on a top plane of the instrument panel in front of the front passenger's seat.

2. Description of Related Art

Conventionally, an airbag apparatus for a front passenger's seat is mounted on a top plane of the instrument panel and includes an airbag folded and housed in an open-top case. In operation, the airbag once protrudes upward from the case while unfolding and then inflates rearward in such a manner as to take up a space between the top plane of the instrument panel and the windshield. In order to smoothly protect an occupant seated proximate the instrument panel, it is desired that a lower part of the airbag that is deployable below the top plane of the instrument panel at full inflation quickly unfurls downward, rather than upward.

JP 10-194065 discloses an airbag apparatus for a front passenger's seat. The apparatus includes an airbag that includes an upper folded-up portion which folds up an upper part of the airbag deployable above the top plane of the instrument panel and a lower folded-up portion which folds up a lower part of the airbag deployable below the top plane of the instrument panel. The upper folded-up portion is located above the inflator whereas the lower folded-up portion is located at the rear of the inflator when housed in the case.

However, although the upper folded-up portion and lower folded-up portion of the above airbag apparatus are housed in the case in a mutually separated manner, it is merely for the space-saving purpose. It has not been considered to so control the deployment behavior of the airbag such that the emergence of the lower folded-up portion from the case is delayed relative to the upper folded-up portion and the lower folded-up portion further deploys downward.

SUMMARY OF THE INVENTION

An object of the present invention is to provide an airbag apparatus for a front passenger's seat that can deploy a lower part of the airbag deployable below the top plane of the instrument panel at full inflation downward rather than upward quickly in an early stage of airbag deployment.

The object of the present invention is attained by the airbag apparatus having the following structure:

The airbag apparatus for a front passenger's seat mountable on an interior of a top plane of an instrument panel in front of a front passenger's seat of a vehicle includes:

a case including a bottom wall, a circumferential wall extending upward from a peripheral edge of the bottom wall in a cylindrical shape and an opening on top and thus having a generally open-top box shape, the case including a front storage area that has an airbag mounting plane and a rear storage area that is located at the rear of the front storage area and includes a rear bottom wall which is located at a lower level than the airbag mounting plane of the front storage area;

an inflator stored in the front storage area of the case;

a folded-up airbag inflatable with inflation gas and deployable upward and rearward in such a manner as to fill in a space between the top plane of the instrument panel and a windshield disposed above the instrument panel, the airbag, at full inflation, being formed into a generally square conical contour whose top is disposed at the front end of the airbag, the airbag including a rear side wall deployable generally vertically at the rear end of the airbag, a circumferential wall that extends forward from an outer peripheral edge of the rear side wall in a narrowing, conical fashion, a gas inlet port located at the vicinity of the front end of the airbag at full inflation and a peripheral area of the gas inlet port secured to the airbag mounting plane of the front storage area of the case, the airbag in a folded state including a lower folded-up portion that is formed by folding up a lower inflatable portion of the airbag deployable at a lower side relative to the top plane of the instrument panel and is housed in the rear storage area of the case and a general portion that is a portion of the airbag except the lower folded-up portion and is housed above the inflator inside the front storage area of the case; and means for restraining emergence of the lower folded-up portion of the airbag from the opening of the case in an early stage of airbag deployment by holding down top planes of left and right end regions of the lower folded-up portion, the means for restraining being located proximate left and right edges of the opening of the case in the rear storage area.

In operation of the airbag apparatus of the invention, when fed with inflation gas from the inflator, the general portion of the airbag housed above the inflator inside the front storage area of the case admits inflation gas firstly, then unfurls and emerges from the opening of the case. At this point, the lower folded-up portion is suppressed from emerging from the opening of the case generally concurrently with the general portion since the lower folded-up portion is housed in the rear storage area that is deeper than the front storage area by having the rear bottom wall located at a lower level than the airbag mounting plane of the front storage area and, the left and right end regions of the lower folded-up portion are held down from above by the emergence restraining means. Therefore, the lower folded-up portion makes a delayed emergence from the opening of the case relative to the general portion.

Moreover, since the lower folded-up portion is housed inside the rear storage area with the top planes of left and right end regions held down by the emergence restraining means, when the general portion emerges from the opening of the case and inflates such that an upper area of the rear side wall faces rearward, a central region in a transverse or left and right direction of the lower folded-up portion which is not held down by the emergence restraining means, i.e. a central area in a transverse direction of a lower area of the rear side wall that constitutes the lower inflatable portion, deploys rearward from the opening of the case following the rearward movement of the upper area of the rear side wall which constitutes the general portion. Subsequently, if the central region in a transverse direction of the lower inflatable portion of the airbag inflates in such a manner as to move the central area in a transverse direction of the lower area of the rear side wall rearward, the left and right end regions of the lower folded-up portion, which had been held down by the emergence restraining means, emerge from the opening of the case and deploys. At this time, the general portion and the central region in a transverse direction of the lower inflatable portion, which have inflated to some extent, come to depress the left and right end regions of the lower folded-up portion that are emerging from the opening of the case, such that the lower folded-up portion is allowed to deploy downward rather than rearward. Accordingly, the lower inflatable portion deployable below the top plane of the dashboard deploys quickly downward, not rearward, in an early stage of deployment.

Therefore, the airbag apparatus for a front passenger's seat of the invention can quickly deploy the portion of the airbag which is deployable below the top plane of the dashboard downward rather than upward in an early stage of airbag deployment.

The airbag apparatus designed as described above desirably includes a wrapping member that wraps up the folded-up airbag thoroughly for keeping the folded-up configuration and includes a bag portion that houses the lower folded-up portion wholly and a tearable portion that is tearable upon airbag deployment. It is desired that the wrapping member is mounted around the folded-up airbag such that the tearable portion is located immediately above a center in an anteroposterior direction of the front storage area and forward of an upper side of the lower folded-up portion and that the means for restraining is comprised of a region of the wrapping member located at the rear of the tearable portion.

With the above configuration, the wrapping member itself can be utilized as the emergence restraining means by forming the bag portion for housing the lower folded-up portion in the wrapping member and locating the tearable portion out of position in an anteroposterior direction. Accordingly, there is no need to provide a separate means or member to act as the emergence restraining means, thus saving the manufacturing cost.

The tearable portion formed on the wrapping member, when torn, forms an opening shaped like a rugby ball that is widest at the transverse center by turning up regions of the wrapping member that are located at the front and rear of the tearable portion. That is, after the tear of the tearable portion, the front edge of the region of the wrapping member located at the rear of the tearable portion (namely, the cover region) forms such an inclination that the center is located rearward whereas left and right ends are located forward, such that the cover region has greater anteroposterior width measured from the rear edge of the case at left and right edges. Thus, when the general portion of the airbag emerges from the opening provided by the tear of the tearable portion, left and right end regions of the cover region hold down top planes of the lower folded-up portion over a wide area in an anteroposterior direction. Furthermore, since the left and right end regions of the cover region are formed to extend from the bag portion that houses the lower folded-up portion thoroughly, even when the general portion of the airbag moves upward, the left and right end regions of the cover region are suppressed from moving upward in such a manner as to turn up end regions, and thus securely holding down the top planes of the lower folded-up portion.

It is desired that the bag portion of the wrapping member is formed by folding back a base material on a horizontal crease and coupling each of left and right edges together. With this configuration, the coupled seams are located proximate the region acting as the emergence restraining means. The seams act as reinforcement to prevent the region acting as the emergence restraining means from being so deformed as to stretch upward, such that the top planes of the left and right end regions of the lower folded-up portion are held down securely.

It is further desired that the tearable portion includes a plurality of straight slits that slit up the wrapping member and that the slits extend across a base line that runs in a transverse direction immediately above the center in an anteroposterior direction of the front storage area with adjacent ends of the slits located proximate to one another and thus forming a generally mountain shape as viewed from above.

With this configuration, when the tearable portion is torn in an early stage of airbag inflation, areas of the wrapping member around the tearable portion open up in an anteroposterior direction at the center in a transverse direction and form a large opening, thus allowing the general portion of the airbag to emerge from the opening quickly.

The tearable portion may alternatively be formed of a series of intermittent slits that extend straightly in a transverse direction on the wrapping member.

Although an opening provided by the tear of such tearable portion may not be so big in an anteroposterior direction as that of the foregoing tearable portion, an area of the wrapping member around the tearable portion, especially left and right end areas act as a drag, thus enhancing the action of restraint of the emergence restraining means formed by the area at the rear of the tearable portion.

It is also desired that the airbag in a folded-up state includes:

a preparatory folding that flattens a generally whole area of the rear side wall and folds up the circumferential wall such that a top area of the rear side wall opposes the gas inlet port in a vertical direction;

a lateral folding that folds up the airbag subjected to the preparatory folding such that a lateral dimension of the airbag is reduced to fit into the case; and an anteroposterior folding that folds up the airbag subjected to the lateral folding such that an anteroposterior dimension of the airbag is reduced to fit into the case.

That is, if the anteroposterior folding is applied to the airbag that has been contracted in a transverse direction to fit into the case, the lateral dimension of all the folded-up airbags is made uniform in comparison with a case where the lateral folding is conducted after the anteroposterior folding, and thus facilitating encasing of the folded-up airbags. Further, since the circumferential wall of the airbag is folded up such that the top area of the rear side wall opposes the gas inlet port in the preparatory folding step, in an initial stage of airbag inflation, the inflation gas discharged from the inflator and passed through the gas inlet port immediately pushes up the top area of the rear side wall, thus helping the general portion of the airbag housed above the inflator inside the front storage area to emerge quickly from the opening of the case.

In the airbag apparatus having above structure, the deployment angle of the lower folded-up portion on the top plane of the instrument panel is adjustable by varying a level difference between levels of the rear bottom wall of the rear storage area and the airbag mounting plane of the front storage area.

When the rear storage area is so formed that the level difference between the rear bottom wall and the airbag mounting plane of the front storage area is great, the rear storage area becomes deep relative to the front storage area, and thus further delaying the initiation of the emergence of the lower folded-up portion from the opening of the case. As a result, the lower folded-up portion emerging from the case is pressed down by the general portion and a rear central region of the lower inflatable portion of the airbag that have already moved considerably rearward, so that the lower folded-up portion deploys downward on the top plane of the dashboard at a great downward angle relative to a horizontal direction. The deployment angle of the lower folded-up portion can thus be suitably adjusted in accordance with the angle of the rear plane of the dashboard of a vehicle on which the airbag apparatus is to be mounted. By way of example, if the airbag apparatus is mounted on such a vehicle that the angle of the rear plane of the dashboard is great relative to a horizontal direction as viewed from a side, the level difference between the bottom wall of the rear storage area and the airbag mounting plane of the front storage area should be set large. This way the lower folded-up portion of the airbag deploys downward along the rear plane of the dashboard, rather than rearward.

BRIEF DESCRIPTIONS OF DRAWINGS

FIGS. 15A, 15B, 16A, 16B, 17A, 17B and 17C illustrate the process of folding up the preparatorily folded airbag of FIG. 11;

Figure 27A:
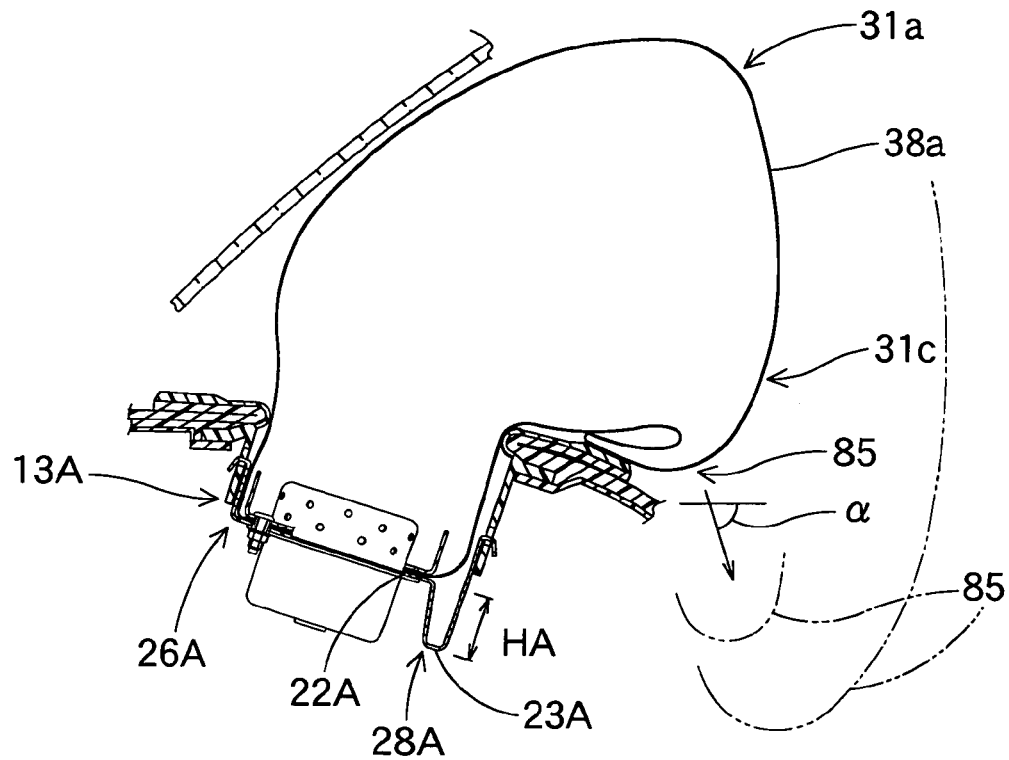
Figure 27B:
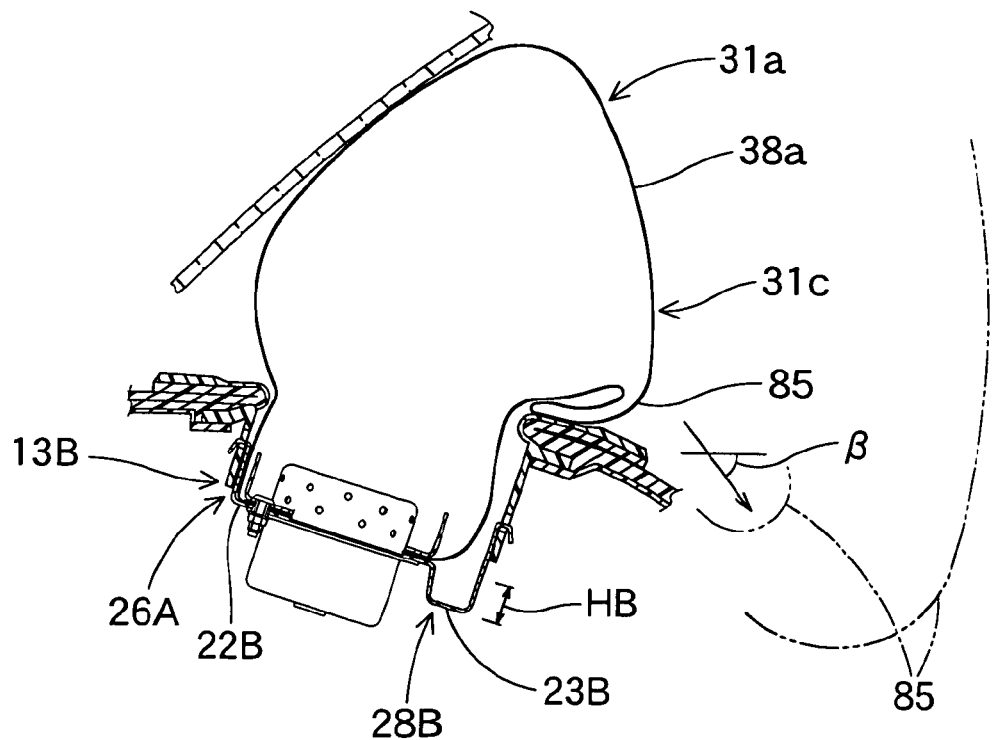
Figure 28:
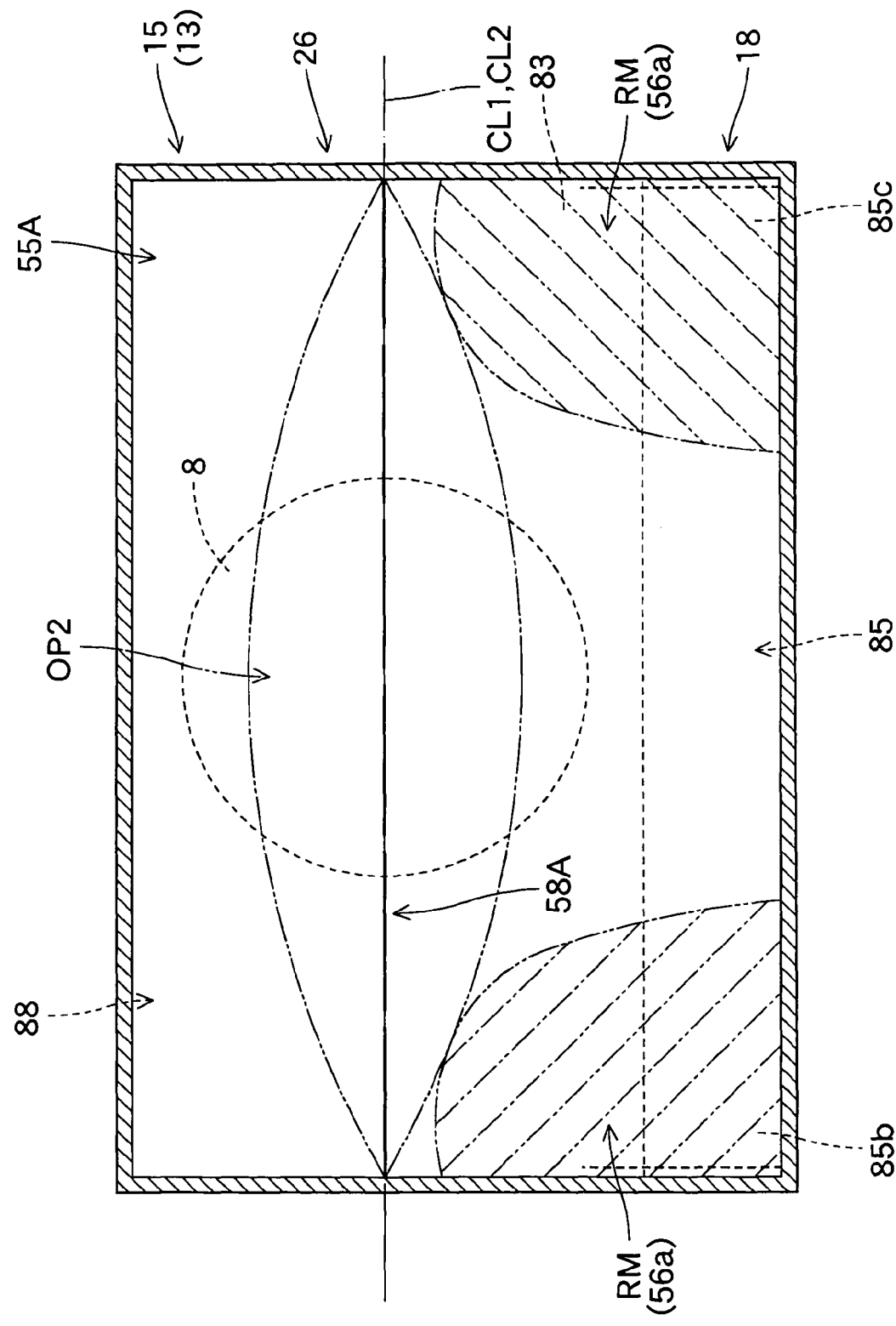

FIGS. 27A and 27B schematically illustrate behaviors of airbags that are housed in cases with modified rear storage areas; and FIG. 28 is a schematic cross section of the airbag apparatus showing that the folded-up body of the airbag wrapped by the wrapping member having a modified tearable portion is housed in the case.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
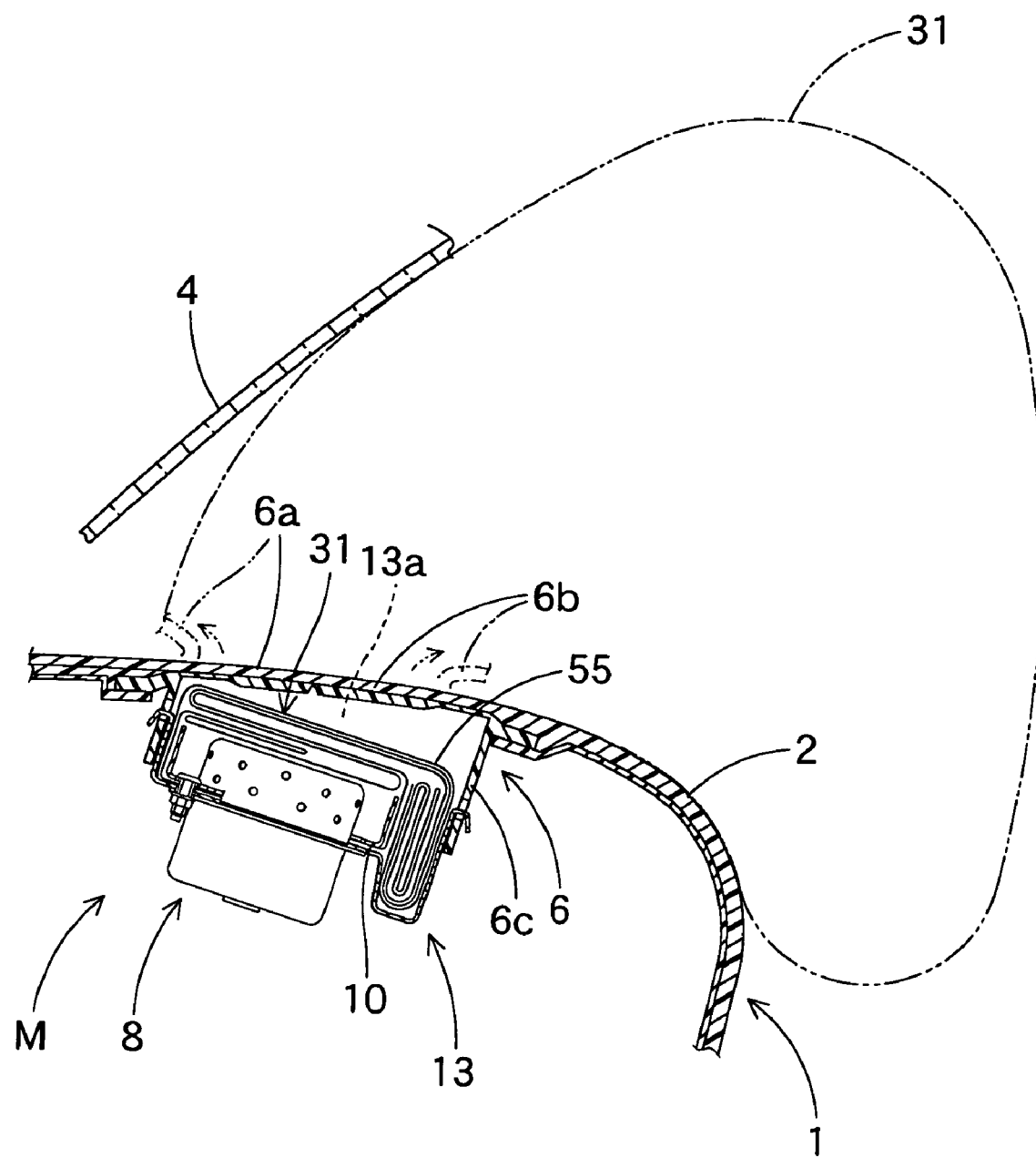
FIG. 1 is a sectional view of an airbag apparatus for a front passenger's seat embodying the present invention, taken along an anteroposterior direction of a vehicle.
Figure 2:
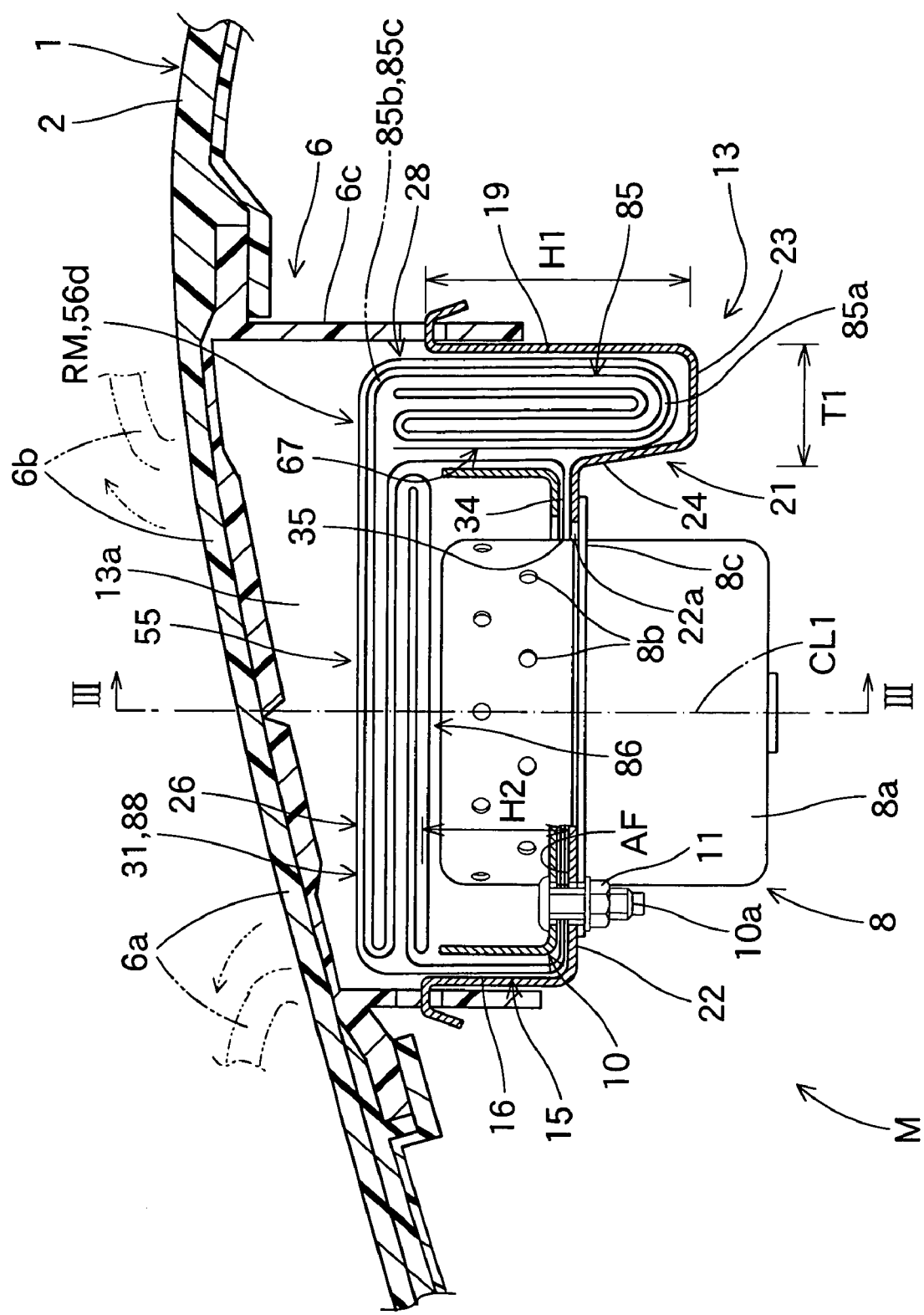
FIG. 2 is an enlarged sectional view of the airbag apparatus of FIG. 1 taken along an anteroposterior direction of a vehicle.
Figure 3:
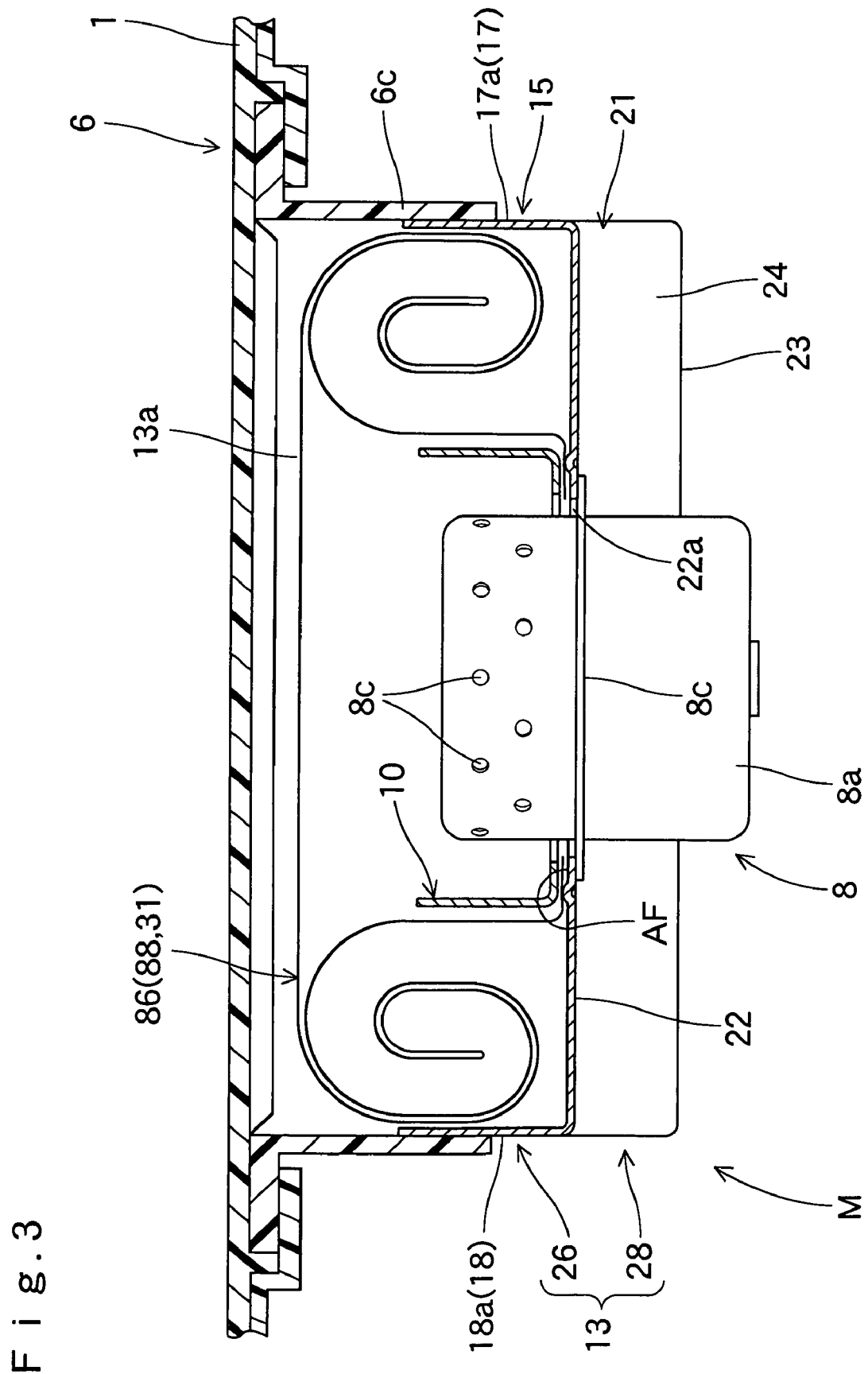
FIG. 3 is an enlarged sectional view of the airbag apparatus of FIG. 1 taken along line III-III of FIG. 2.

As shown in FIG. 1, an airbag apparatus M for a front passenger's seat embodying the invention is a top-mount type that is mounted in an interior of a top plane 2 of an instrument panel or dashboard 1. Referring to FIGS. 1 to 3, the airbag apparatus M includes a folded-up airbag 31, a wrapping member 55 that wraps up the airbag 31 in a folded-up state, an inflator 8 for supplying the airbag 31 with inflation gas, a case 13 for housing and holding the airbag 31 and inflator 8, a retainer 10 for attaching the airbag 31 to the case 10 and an airbag cover 6 for covering the folded-up airbag 31.

Unless otherwise specified, up/down, front/rear and left/right directions in this specification are intended to refer to up/down, front/rear and left/right directions of a vehicle being steered straight ahead.

The airbag cover 6 is integral with the dashboard 1 made from synthetic resin, and includes two doors, i.e. front and rear doors 6a and 6b adapted to open when pushed by the inflating airbag 31 upon airbag deployment. The airbag cover 6 further includes around the doors 6a and 6b a joint wall 6c that is mounted around and coupled to a later-described circumferential wall 15 of the case 13.

The inflator 8 includes a body portion 8a having a generally columnar shape and provided with gas discharge ports 8b, and a flange 8c for attaching the inflator 8 to the case 13.

Figure 21:
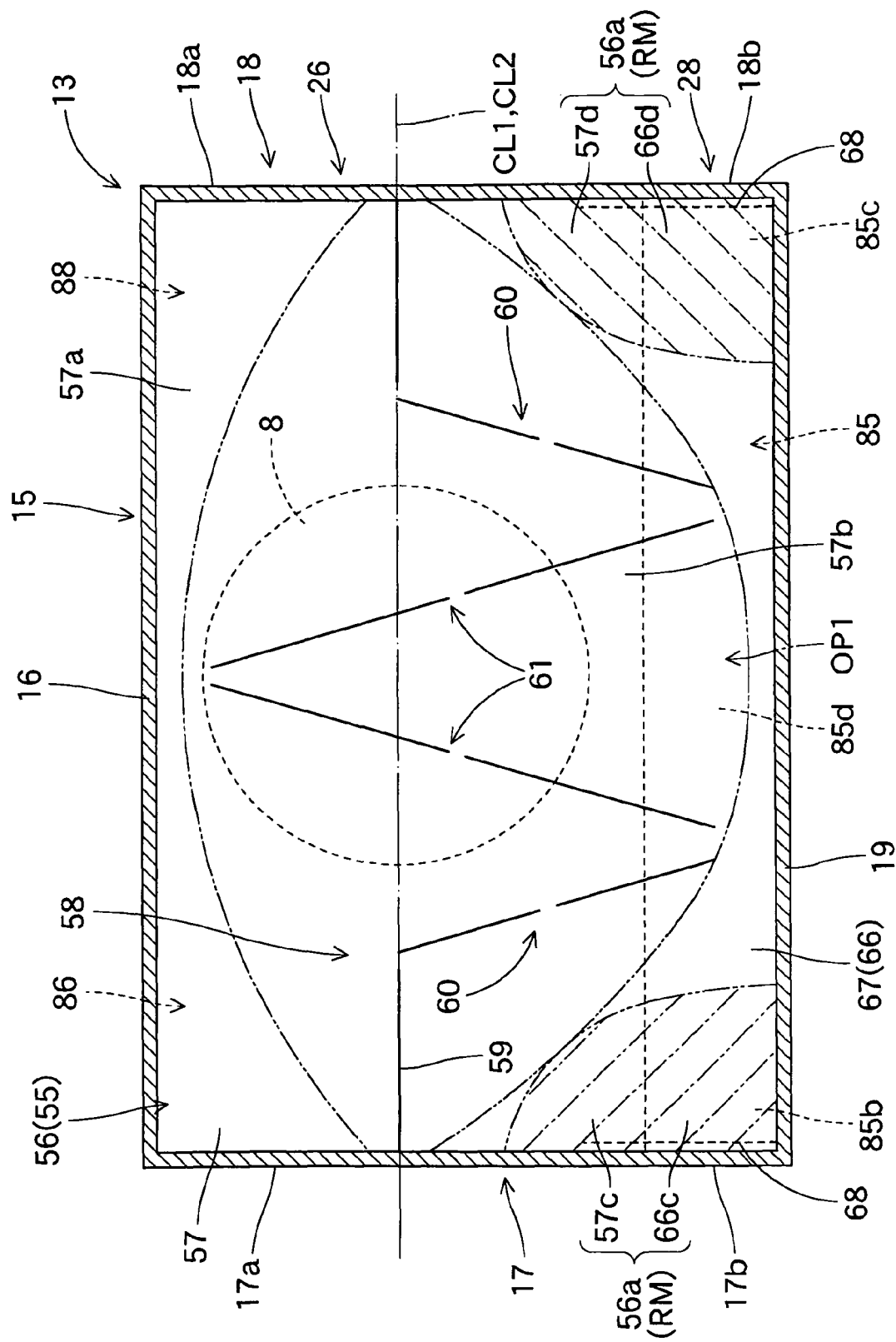
FIG. 21 is a schematic cross section of the airbag apparatus of FIG. 1 showing that the folded-up body of the airbag wrapped by the wrapping member is housed in the case.

The case 13 is made of sheet metal and has a generally rectangular parallelepiped shape with a rectangular opening 13a at the top. As shown in FIGS. 2 and 3, the case 13 includes a bottom wall 21 having a generally rectangular plate shape and a circumferential wall 15 extending upward from the peripheral edge of the bottom wall 21 in a generally square cylindrical shape. The circumferential wall 15 is coupled to the joint wall 6c of the airbag cover 6. In this specific embodiment, as referred to FIG. 1, the case 13 is mounted on a vehicle at a slight slant relative to the vertical direction, more particularly, such that its axis extends in such an inclined manner that the lower side is oriented forward whereas the upper side is oriented rearward. The case 13 includes a front storage area 26 and a rear storage area 28 located at the rear of the front storage area 26. The front storage area 26 and the rear storage area 28 are equal in a lateral dimension but have different depths. The rear storage area 28 has a greater depth than the front storage area 26, so that the bottom wall 21 has a step in between them. More specifically, the circumferential wall 15 of the case 13 has a square cylindrical shape with an uniform lateral dimension whereas the bottom wall 21 is formed with a step including a front floor 22 that constitutes a bottom of the front storage area 26, a rear floor 23 that constitutes a bottom of the rear storage area 28 and a link wall 24 that connects the rear end of the front floor 22 and the front end of the rear floor 23. The link wall 24 extends generally along an axial direction of the case 13. As shown in FIGS. 2, 3 and 21, the front storage area 26 is defined by a front wall 16 of the circumferential wall 15, a front area 17a of a left wall 17, a front area 18a of a right wall 18 and the front floor 22 of the bottom wall 21. The rear storage area 28 is defined by a rear wall 19 of the circumferential wall 15, a rear area 17b of the left wall 17, a rear area 18b of the right wall 18, the rear floor 23 of the bottom wall 21 and the link wall 24.

The front storage area 26 is an area that accommodates the inflator 8 and a later-described upper folded-up portion 86 of a folded-up body 88 of the airbag 31. The inflator 8 is secured to a peripheral area of an insert hole 22a formed on the front floor 22 with an upper region of the body portion 8a inserted into the insert hole 22a, and thus is housed in the front storage area 26. More specifically, the inflator 8 is secured to the front floor 22 together with a later-described peripheral area 34 of a gas inlet port 35 of the airbag 31, utilizing a retainer 10 placed inside the airbag 31, by putting bolts 10a of the retainer 10 through the peripheral area 34 of the gas inlet port 35 of the airbag 31, the front floor 22 of the front storage area 26 and the flange 8c of the inflator 8 and then fastening the bolts 10a with nuts 11. That is, a top surface of the front floor 22 of the front storage area 26 acts as a mounting plane AF that mounts the peripheral area 34 of the gas inlet port 35 of the airbag 31 to the front storage area 26. In this specific embodiment, in the housed state of the airbag 31, the upper folded-up portion 86 is placed on top of the inflator 8.

The rear storage area 28 is an area that accommodates a later-described lower folded-up portion 85 of the folded-up body 88 that refers to a completely folded-up state of the airbag 31. The height (or depth) H1 of the rear storage area 28 is configured greater than the height (or depth) H2 of the front storage area 26 with the rear floor 23 sunken from the front floor 22 of the front storage area 26, i.e. from the mounting plane AF. As shown in FIG. 2, the anteroposterior dimension (or the distance between the link wall 24 and rear wall 19) T1 and the height H1 of the rear storage area 28 are so sized to house the lower folded-up portion 85 having the leading end 85a oriented downward. Although the accompanying drawings illustrate as if there are spaces between the folded-up body 88 and the wrapping member 55 that wraps it up and between the wrapping member 55 and the case 13, it is only for the purpose of clearly distinguishing borders in between the folded-up body 88, the wrapping member 55 and the case 13. Practically, the folded-up body 88 of the airbag 31 is wrapped up by the wrapping member 55 tightly and housed in the case 13 in a stuffing manner, with no spaces in between.

Figure 4:
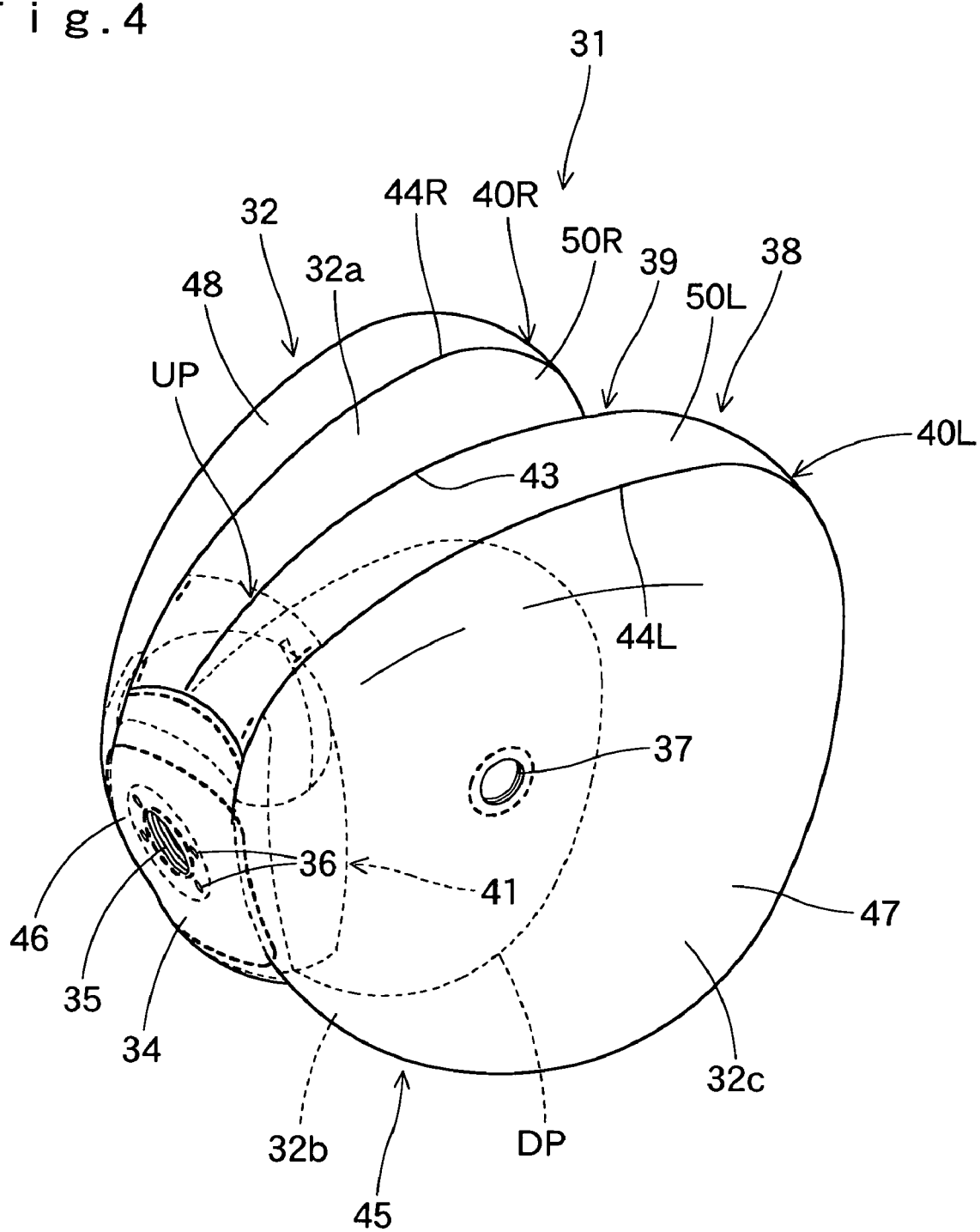
FIG. 4 is a perspective view of an airbag used in the airbag apparatus of FIG. 1, inflated by itself and viewed from the front side.
Figure 5:
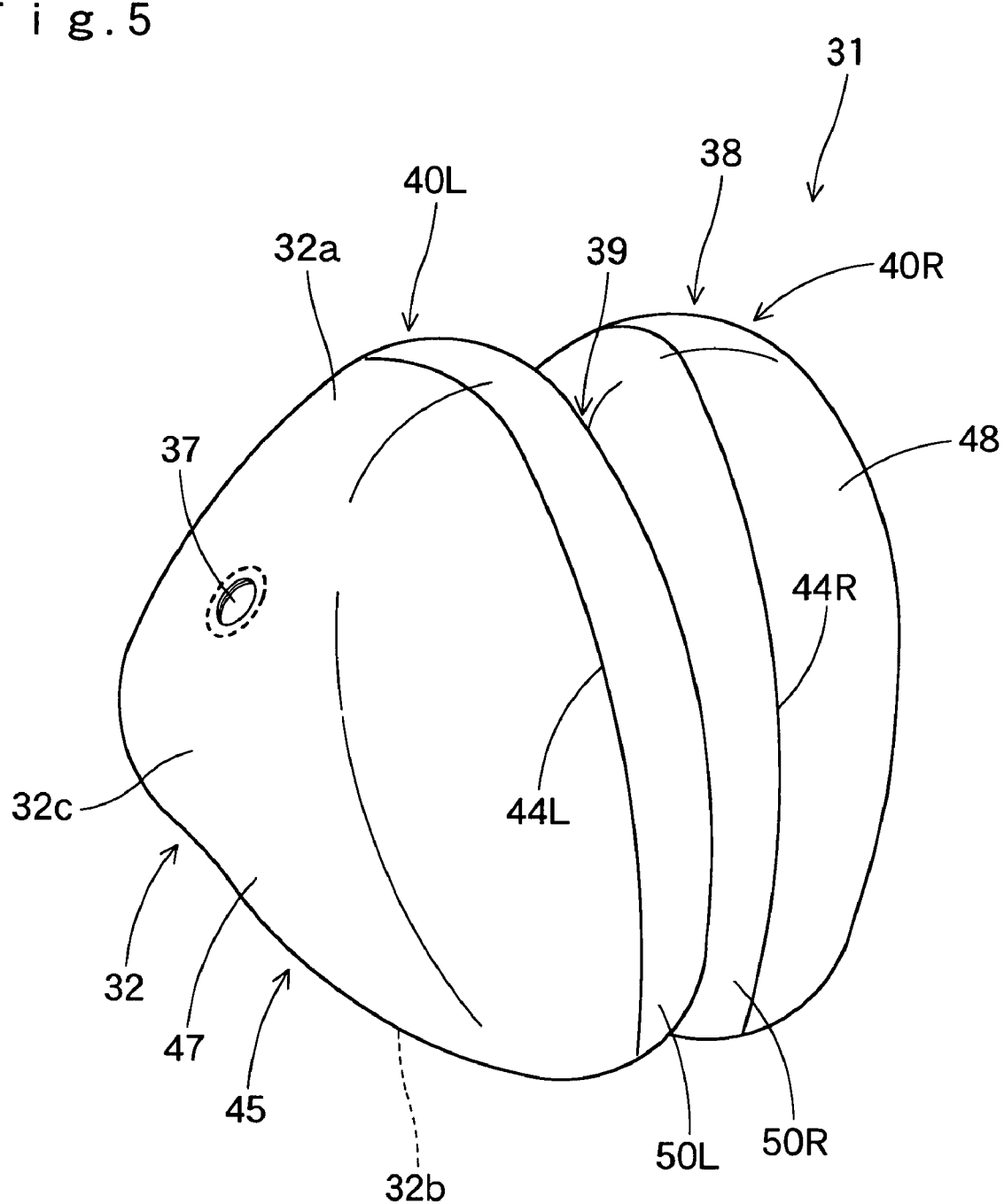
FIG. 5 is a perspective view of the airbag of FIG. 4 inflated by itself and viewed from the rear side.

The airbag 31 is formed into a bag shape deployable to take up a space between the top plane 2 of the dashboard 1 and the windshield 4 thereabove. More specifically, referring to FIGS. 4 to 6, the airbag 31 is designed to be inflated into a generally square conical contour whose front end is the top of the square cone. The airbag 31 includes a rear side wall 38 deployable generally vertically at the rear end and a circumferential wall 32 extending forward from the outer peripheral edge of the rear side wall 38 in a narrowing, conical fashion. The circumferential wall 32 includes an upper side wall 32a and a lower side wall 32b extending generally horizontally on upper and lower sides, a left side wall 32c and a right side wall 32d extending generally along an anteroposterior direction on left and right sides. At the vicinity of the lateral center of the front end of the lower side wall 32b at full inflation is a round gas inlet port 35 for introducing inflation gas. In the periphery 34 of the inlet port 35 are mounting holes 36 for receiving the bolts 10a of the retainer 10 to attach the peripheral region 34 of the port 35 to the front floor 22 of the case 13. That is, the airbag 31 is mounted on the case 13 at the peripheral region 34 of the gas inlet port 35. Each of the left side wall 32c and right side wall 32d of the airbag 31 is provided with a vent hole 37 for releasing extra inflation gas (FIGS. 4 to 6).

Figure 24:
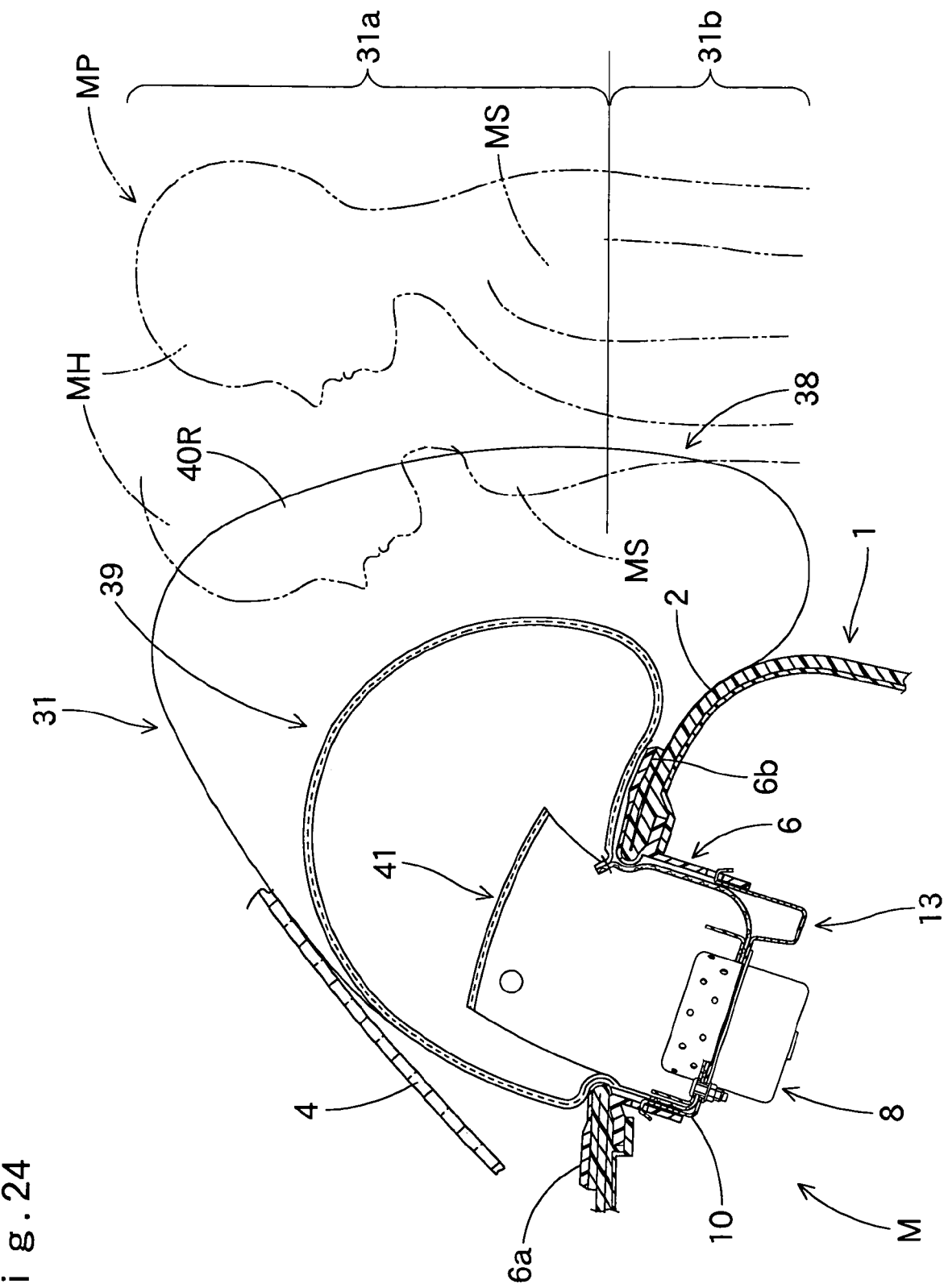
FIG. 24 is a schematic section of the airbag at full inflation as viewed from a side.

The rear side wall 38 of the airbag 31 is deployable to face toward an occupant in an undulated fashion. Specifically, upon airbag deployment, the rear side wall 38 includes a recess 39 that recesses forward at the lateral center and a pair of raised regions 40L and 40R that relatively protrude rearward on the left and right of the recess 39 as shown in FIGS. 5 and 6. The recess 39 as well as the raised regions 40L and 40R are formed continuously over a generally entire vertical area of the rear side wall 38. As shown in FIG. 24, when the airbag apparatus M is activated and the rear side wall 38 is thrown against an occupant MP, the raised regions 40L and 40R firstly arrest his/her shoulders MS and then the recess 39 and its vicinity area receives and protect a head MH of the occupant MP when it enters into the recess 39 while the shoulders MS are arrested by the raised regions 40L and 40R. In the airbag 31, the leading end of the recess 39 is formed by a sewn seam 43 that sews inner circumferential edges 50a of later-described second base cloths 50L and 50R together whereas the tops of the raised regions 40L and 40R are formed by sewn seams 44L and 44R that sew each of circumferential edges 47a and 48a of left portion 47 and right portion 48 of a later-described first base cloth 45 and each of corresponding outer circumferential edges 50d of the second base cloths 50L and 50R. In this embodiment, the undulation formed by the recess 39 and the raised regions 40L and 40R extend forward in such a manner as to enter the upper side wall 32a and lower side wall 32b of the circumferential wall 32 and continue up to the vicinity of the gas inlet port 35.

Figure 6:
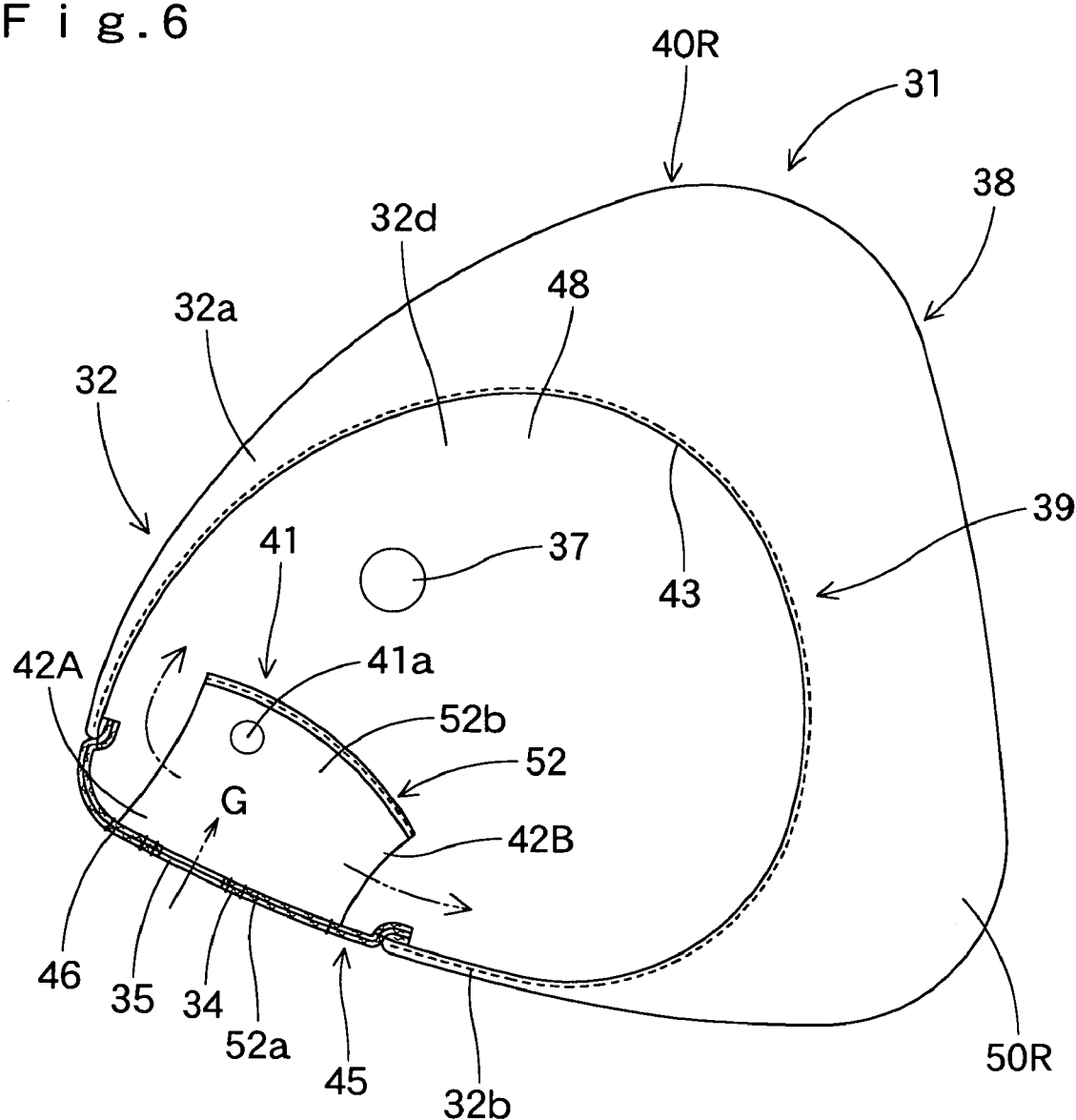
FIG. 6 is a sectional view of the airbag of FIG. 4 inflated by itself, taken along the anteroposterior direction.

As shown in FIG. 6, the airbag 31 is internally provided with a flow regulating cloth 41. The flow regulating cloth 41 is disposed over the gas inlet port 35 and has a generally cylindrical shape opened at the front and rear ends so as to redirect inflation gas G fed via the inlet port 35 forward and rearward. That is, as shown in FIG. 6, inflation gas G fed via the inlet port 35 is supplied into the airbag 31 along an anteroposterior direction from front and rear openings 42A and 42B of the flow regulating cloth 41. The flow regulating cloth 41 includes on laterally symmetric positions generally at the vertical center two round through holes 41a. The through holes 41a help stabilize the orientations of the front and rear openings 42A and 42B of the flow regulating cloth 41 so as to stabilize directions of inflation gas G flowing into the airbag 31 upon airbag deployment. In this specific embodiment, the flow regulating cloth 41 is made of a material cloth 52 shown in FIG. 7. The material cloth 52 is laterally symmetric in contour and includes a joint portion 52a that is located at the center and joined to the periphery 34 of the gas inlet port 35 and two main bodies 52b extending to the left and right from the joint portion 52a. The material cloth 52 is formed into the flow regulating cloth 41 by sewing the joint portion 52a to the periphery 34 of the gas inlet port 35 and then by sewing leading ends of the main bodies 52b together.

Figure 7:
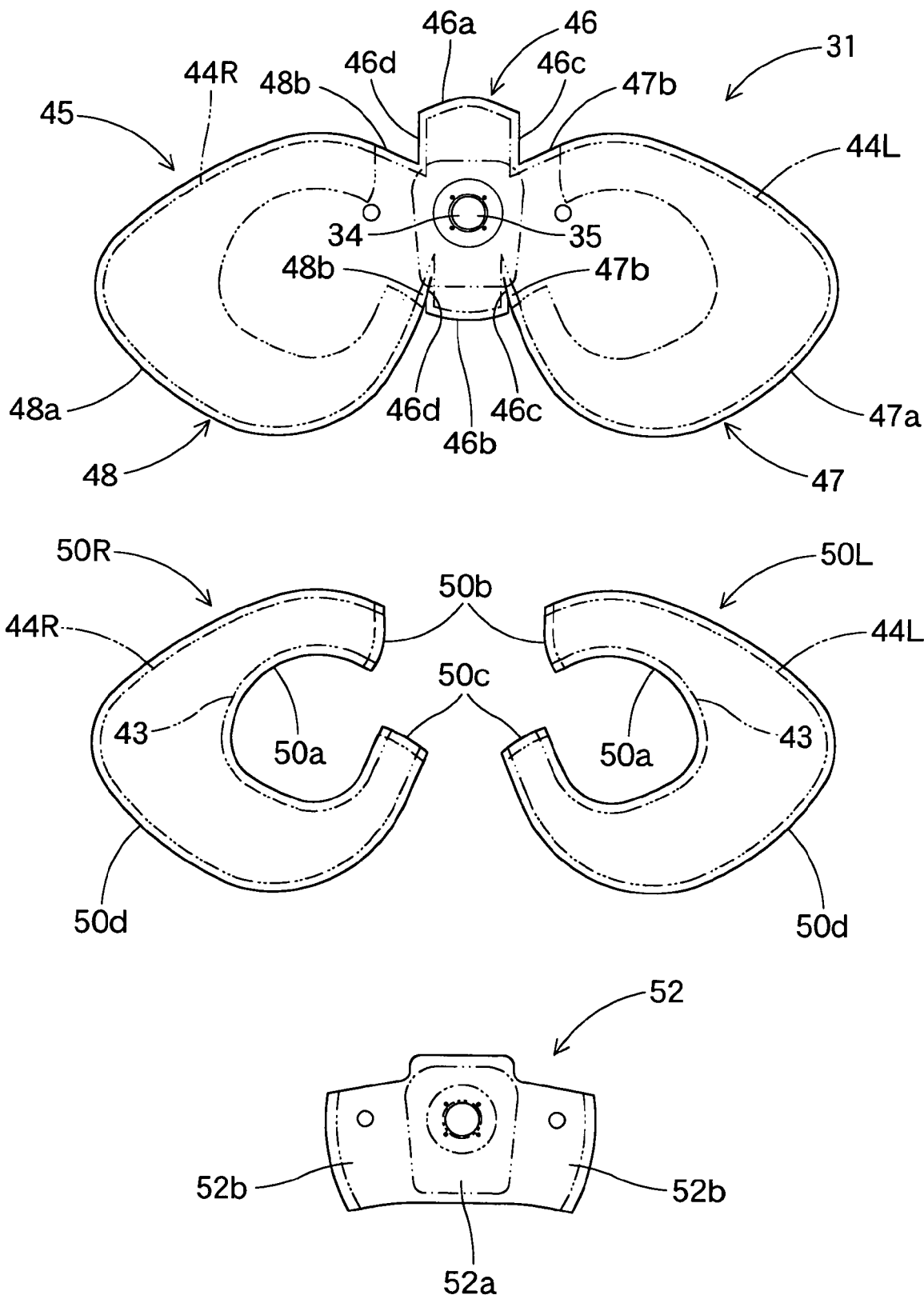
FIG. 7 illustrates components of the airbag of FIG. 4 by plan views.

The airbag 31 is made by joining peripheral edges of predetermined shaped base cloths: a first base cloth 45 that constitutes the left side wall 32c, the right side wall 32d and a front part of the lower side wall 32b and two pieces of second base cloths 50L and 50R that constitute the upper side wall 32a, the rear side wall 38 and a rear part of the lower side wall 32b as shown in FIG. 7.

The first base cloth 45 has a laterally symmetric contour proximate to the figure of a spread butterfly. As shown in FIG. 7, the first base cloth 45 includes a generally rectangular lower part 46 constituting the peripheral region 34 of the gas inlet port 35 and left and right portions 47 and 48 each of which has a generally triangular plate shape and extends toward the left and right from the lower part 46. The lower part 46 makes a front part of the lower side wall 32b of the airbag 31 at full inflation. The left and right portions 47 and 48 mainly constitute the left and right side walls 32c and 32d of the airbag 31 at full inflation, respectively.

Each of the second base cloths 50L and 50R has a band shape curved in a generally C shape. The second base cloths 50L and 50R are so configured to divide an area of the airbag 31 at full inflation from the upper side wall 32a to the lower part of the lower side wall 32b via the rear side wall 38 into two laterally. In this specific embodiment, outer edges 50d of the second base cloths 50L and 50R are configured generally identical to circumferential edges 47a and 48a of the left portion 47 and right portion 48 of the first base cloth 45 except root regions 47b and 48b.

The first base cloth 45, second base cloths 50L and 50R and the material cloth 52 are made of flexible fabric woven by polyester yarn, polyamide yarn or the like. The fabric is not coated by such coating agent as silicone.

Figure 8:
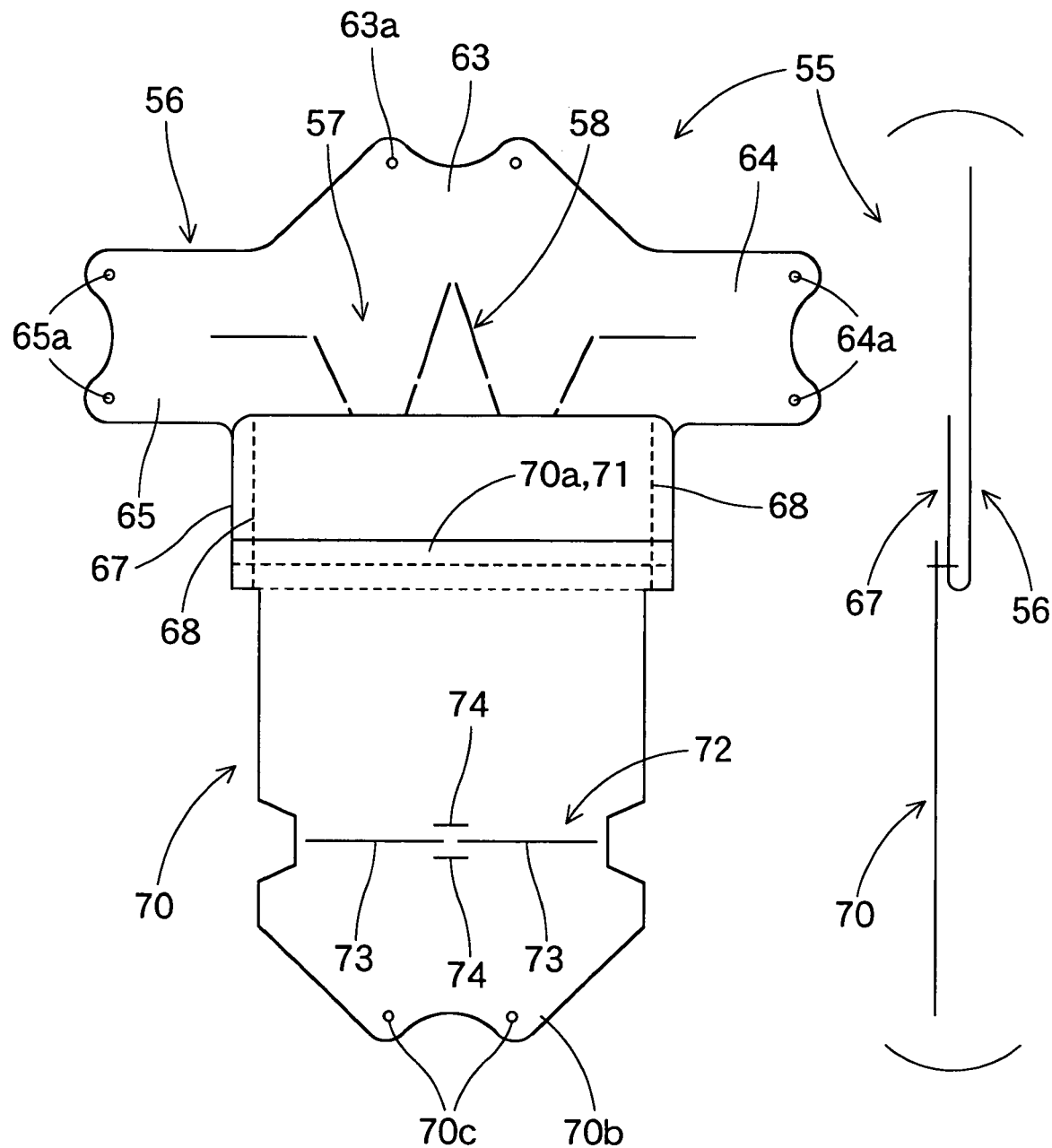
FIG. 8 is a plan view of a wrapping member that wraps up a folded-up body of the airbag.
Figure 9A:
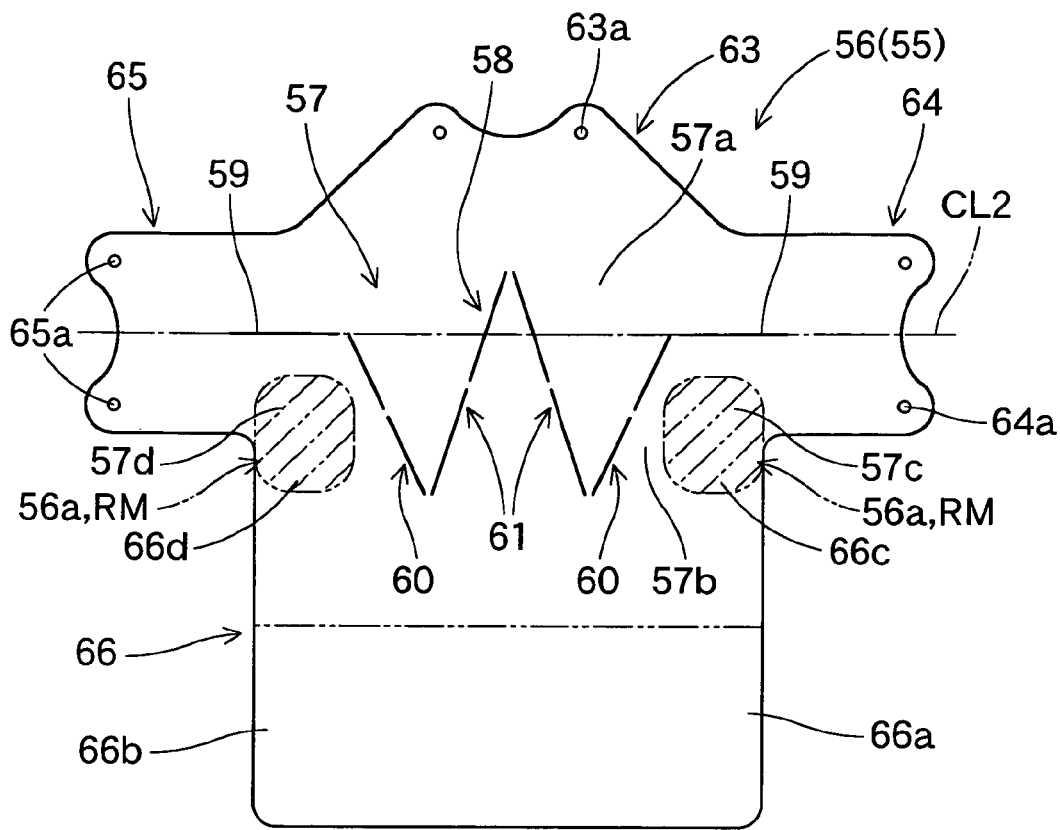
FIG. 9A is a plan view of an inner part of the wrapping member of FIG. 8, as flattened.
Figure 9B:
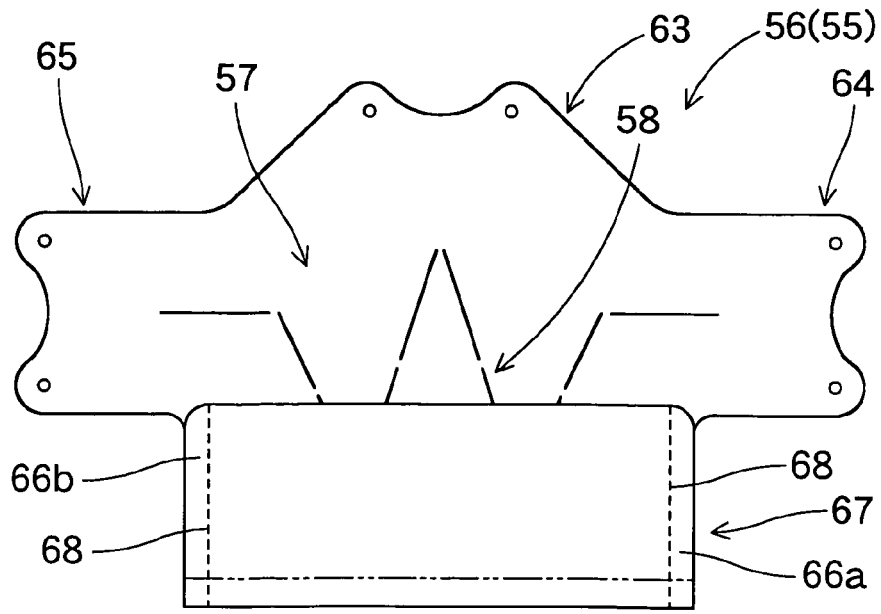
FIG. 9B is a plan view of the inner part of the wrapping member of FIG. 8 after a bag portion is formed.
Figure 10:
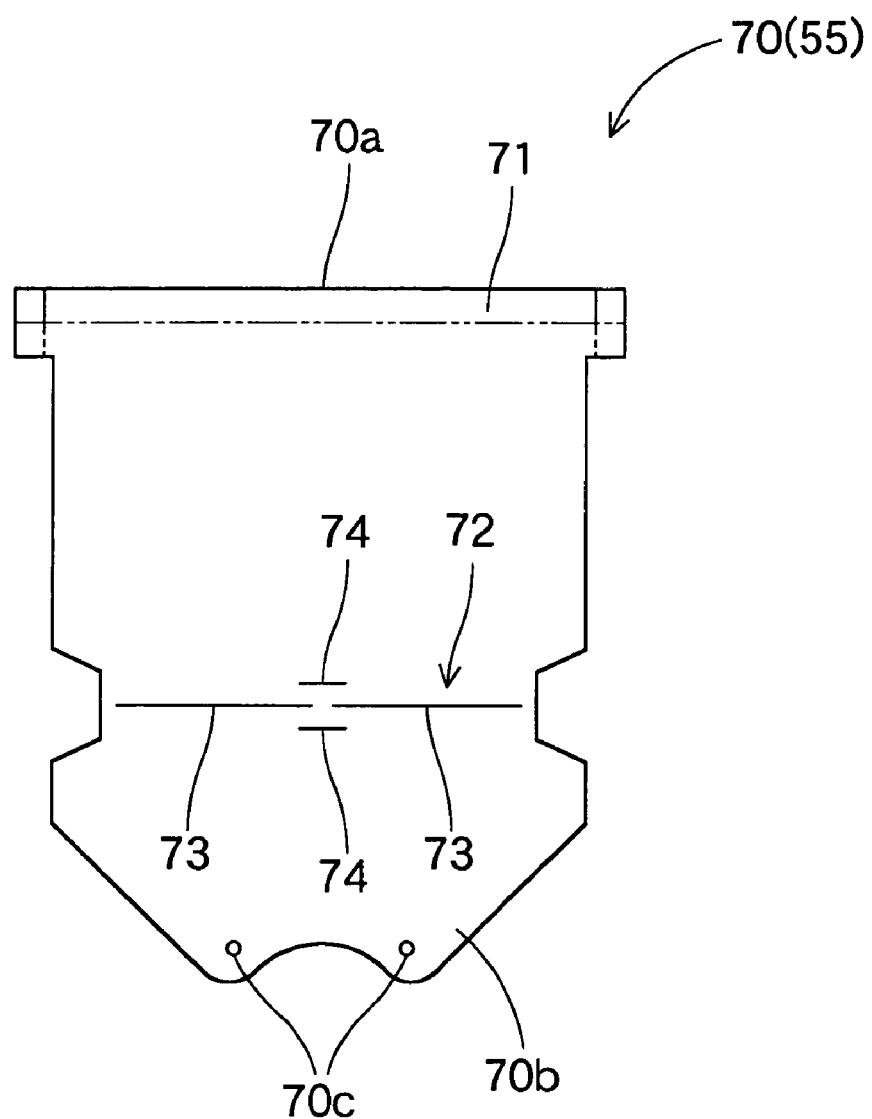
FIG. 10 is a plan view of an outer part of the wrapping member of FIG. 8, as flattened.

As shown in FIGS. 8 to 10, the wrapping member 55 that wraps up the folded-up body 88 of the airbag 31 includes an inner part 56 that covers a generally entire circumference of the folded-up body 88 and an outer part 70 arranged on an outer circumference of the inner part 56. In this specific embodiment, the inner part 56 and outer part 70 are both made of flexible fabric woven by polyester yarn, polyamide yarn or the like as well as the airbag 31. The fabric is not coated by such coating agent as silicone as well.

The inner part 56 covers a whole circumference of the folded-up body 88 and is formed into a generally cross-like shape as shown in FIG. 9A, in a flattened state. The inner part 56 includes a ceiling wall region 57 that is located at the center for covering a top plane of the upper folded-up portion 86 of the folded-up body 88, a front wall region 63 that extends forward from the ceiling wall region 57 for covering the front side of the upper folded-up portion 86, a left wall region 64 and a right wall region 65 that extends respectively to the left and right from the ceiling wall region 57 for covering laterals of the upper folded-up portion 86 and a bag-forming region (or a base material to be formed into a bag) 66 that extends rearward from the ceiling wall region 57. The ceiling wall region 57 and the front wall region 63 each has a lateral width generally identical to that of the folded-up body 88 whereas the left wall region 64 and right wall region 65 each has an anteroposteior width generally identical to that of the folded-up body 88. The bag-forming region 66 is to form a bag portion 67 for housing the lower folded-up portion 85 as described later, and therefore, has a lateral width slightly greater than that of the ceiling wall region 57 so it accommodates the lower folded-up portion 85.

The ceiling wall region 57 for covering the top of the upper folded-up portion 86 of the folded-up body 88 includes a tearable portion 58 that is tearable upon airbag deployment. The tearable portion 58 is located on the anteroposterior center of the front storage area 26 of the case 13 (i.e. on an anteroposterior center line CL1 (FIG. 2) of the front storage area 26) when the wrapping member 55 is mounted around the folded-up body 88 and housed in the case 13. In the illustrated embodiment, the anteroposterior center line CL1 of the front storage area 26 conforms to the center line CL2 (FIG. 9A) that is drawn along a transverse direction (left and right direction) on the anteroposterior center of the ceiling wall region 57 as flattened, when viewed on the basis of a vertical direction extending along the axial direction of the case 13. The tearable portion 58 is formed to extend across the center line CL2 acting as a base line. More specifically, the tearable portion 58 is formed by a plurality of straight slits that slit up the ceiling wall region 57. As shown in FIG. 9A, the tearable portion 58 includes two horizontal slits 59 located at opposite ends in a transverse direction and extending on and along the center line CL2 (i.e. along the transverse direction), two outer slits 60 extending straightly and obliquely inward and rearward from inner ends of the horizontal slits 59 and two inner slits 61 that extend straightly and obliquely inward and forward from inner ends of the outer slits 60, and thus has a laterally symmetric mountain-like or W shape as viewed from above. Each of the inner slits 61 extends forward to cut across the center line CL2. Each of the outer slits 60 is formed to extend into the area of the bag-forming region 66 at the rear end thereof, and each of the horizontal slits 59 is formed to extend into the area of the left wall region 64/right wall region 65 at the outer end thereof. Each of the inner slits 61 and outer slits 60 of the illustrated embodiment is decoupled at the center, and adjacent ends of the horizontal slits 59, outer slits 60 and inner slits 61 are located proximate to one another. If the airbag 31 is fed with inflation gas G from the inflator 8 and starts to inflate, regions between the ends of the horizontal slits 59, outer slits 60 and inner slits 61 get torn so the whole tearable portion 58 is torn and provides a generally rugby ball-like opening (as viewed from above) that is widely open to the front and rear at the lateral center as indicated by double-dashed lines in FIG. 21. In this specific embodiment, regions of the inner part 56 of the wrapping member 55 at the rear of left and right ends of the tearable portion 58 and ranging from the ceiling wall region 57 to the bag-forming region 66 (in other words, regions from left and right edges 57c and 57d of rear part 57b of the ceiling wall region 57 to left and right edges 66c and 66d of front end area of the bag-forming region 66), which are indicated by an area encircled by double-dashed lines in FIGS. 9A and 21, act as cover regions 56a that hold down top planes of later-described left and right end regions 85b and 85c of the lower folded-up portion 85 in an early stage of airbag inflation, and which cover regions 56a constitute means RM for restraining emergence of the lower folded-up portion 85 from the opening 13a of the case 13.

The front wall region 63, left wall region 64 and right wall region 65 respectively include proximate their leading ends two mounting holes 63a, 64a and 65a for receiving the bolts 10a of the retainer 10. The bag-forming region 66 is folded back on a horizontal crease at its anteroposterior center as shown in FIG. 9A, and then sewn or coupled together at each of the edges 66a and 66b by sewn seams 68 as shown in FIG. 9B, thereby forming the bag portion 67 for housing the lower folded-up portion 85 of the folded-up body 88. The bag portion 67 houses the lower folded-up portion 85 in such a manner as to wrap the whole circumference of the portion 85.

The outer part 70 covers the folded-up body 88 wrapped up by the inner part 56 on the front, top and rear sides. As best shown in FIG. 10, the outer part 70 is formed into a band that is elongative in the anteroposterior direction and has a lateral width generally identical to that of the ceiling wall region 57 of the inner part 56. As shown in FIGS. 8 and 10, a region of the outer part 70 proximate the root end 70a acts as a wide region 71 that has an identical width to the bag-forming region 66 of the inner part 56 and couples the outer part 70 to the inner part 56. The wide region 71 is sewn to the rear end of the bag portion 67 over its entire area in a width direction. The outer part 70 includes at the leading end 70b two mounting holes 70c that are mounted on an outer circumference of the front wall region 63 of the inner part 56 for receiving the bolts 10a of the retainer 10. The outer part 70 further includes on a generally anteroposterior center a tearable portion 72. Specifically, the tearable portion 72 is formed on a position to be immediately above and along the center line CL2 of the ceiling wall region 57 of the inner part 56 when the outer part 70 is mounted around the folded-up body 88. The tearable portion 72 is formed by slitting up the outer part 70, and includes two slit bodies 73 that extend straightly on and along the center line CL2 from opposite end regions to the center of the outer part 70 and two supplemental slits 74 that are located on the front and rear of an area between the two slit bodies 73. Breaking of the tearable portion 72 severs the outer part 70 front from rear.

Manufacturing of the airbag 31 is now described. Firstly, the material cloth 52 is laid on the lower part 46 of the first base cloth 45 as flattened and is sewn to the lower part 46 at the position to be the periphery 34 of the gas inlet port 35. Then punching work is applied to form the gas inlet port 35 and mounting holes 36. Then the main bodies 52b of the material cloth 52 are sewn together at the leading ends to form the flow regulating cloth 41. Subsequently, the second base cloths 50L and 50R are overlaid one on the other and the inner circumferential edges 50a thereof are sewn together to provide the sewn seam 43. Subsequently, the second base cloths 50L and 50R are opened so that seam allowances of the inner circumferential edges 50a are disposed inside and front edges 50b of the cloths 50L and 50R form a single generally straight line, and these front edges 50b are sewn to the front edge 46a of the lower part 46 of the first base cloth 45. Likewise, rear edges 50c of the second base cloths 50L and 50R are sewn to the rear edge 46b of the lower part 46 in the first base cloth 45. Then front and rear left edges 46c of the lower part 46 are sewn to the root regions 47b of the circumferential edge 47a of the left portion 47, whereas front and rear right edges 46d are sewn to the root regions 48b of the circumferential edge 48a in the right portion 48.

Thereafter, the circumferential edge 47a of the left portion 47 and the outer edge 50d of the second base cloth 50L are sewn together to provide the sewn seam 44L whereas the circumferential edge 48a of the right portion 48 and the outer edge 50d of the second base cloth 50R are sewn together to provide the sewn seam 44R. The airbag 31 is completed if reversed inside out utilizing the gas inlet port 35 so that seam allowances of edge areas may not appear outside.

Mounting of the airbag 31 thus manufactured on the vehicle is now described. Firstly, the retainer 10 is housed inside the airbag 31 such that the bolts 10a project from the mounting holes 36 of the airbag 31, and then the airbag 31 is folded up in that state. The folding process includes a preparatory folding step, a lateral folding step wherein the lateral width of the airbag is reduced and an anteroposterior folding step wherein the anteroposterior width of the airbag is reduced.

Figure 11:
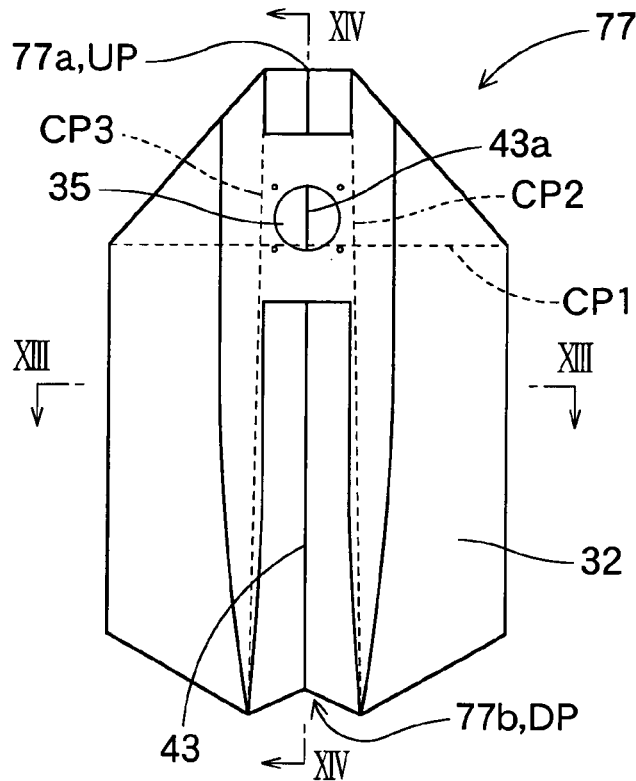
FIG. 11 illustrates the preparatorily folded state of the airbag of FIG. 4 as viewed from a side of the gas inlet port.
Figure 12:
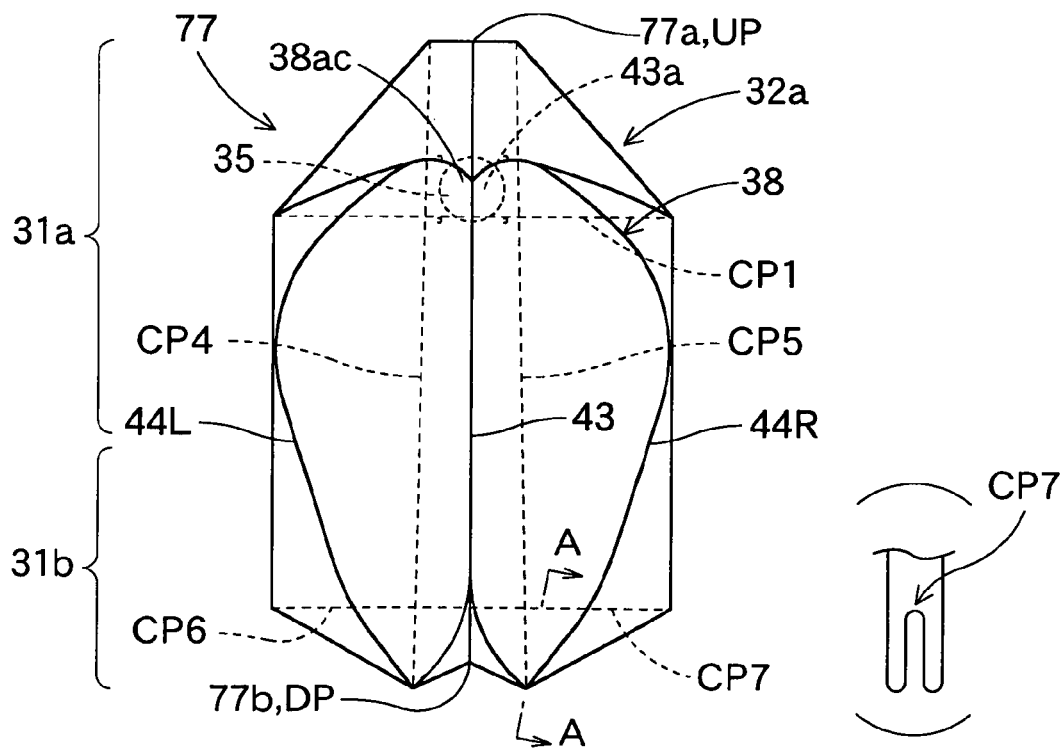
FIG. 12 illustrates the preparatorily folded airbag of FIG. 11 from a side of the rear side wall.
Figure 13:
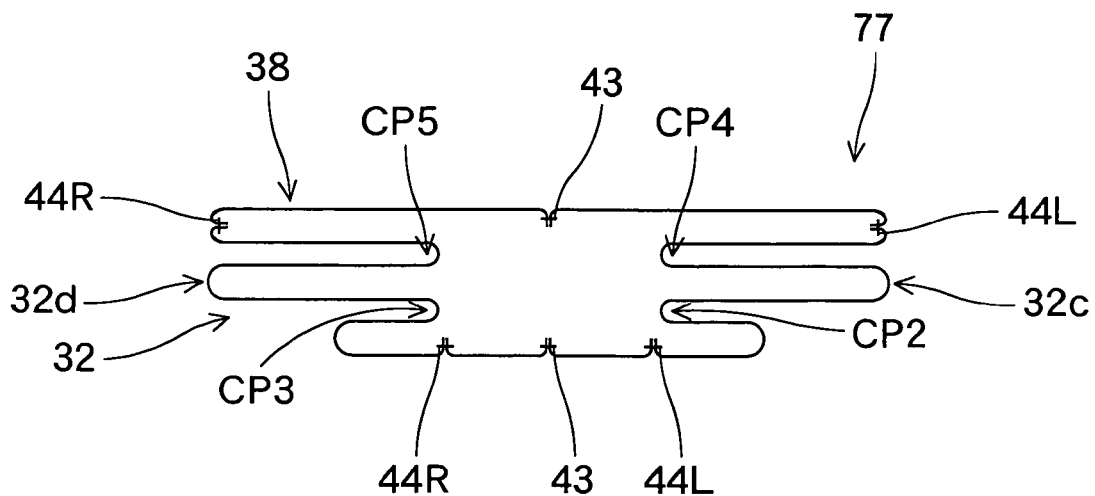
FIG. 13 is an end view taken along line XIII-XIII of FIG. 11.
Figure 14:
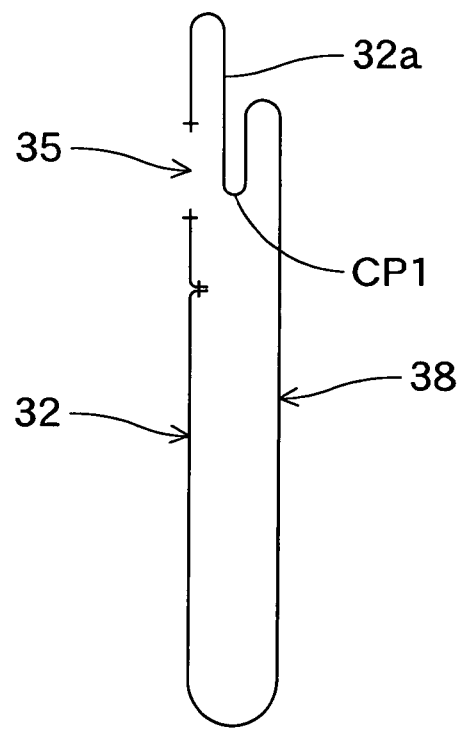
FIG. 14 is an end view taken along line XIV-XIV of FIG. 11.

The preparatory folding step provides a preparatorily folded airbag 77 shown in FIGS. 11 to 14, wherein a generally whole area of the rear side wall 38 of the airbag 31 is flattened by opening the sewn seams 44L and 44R (i.e. the tops of the raised regions 40L and 40R) toward the left and right relative to the sewn seam 43 (i.e. the leading end of the recess 39) which is located on the lateral center of the rear side wall 38. Specifically, the preparatorily folded airbag 77 has a laterally symmetric configuration wherein the sewn seam 43 is arranged along the anteroposterior direction and a laterally central region 38ac of a top area of the rear side wall 38 is located to oppose the gas inlet port 35 in the vertical direction whereas the circumferential wall 32 is folded up. In this specific embodiment, the central region 38ac of the rear side wall 38 in the transverse or left and right direction opposes the gas inlet port 35 with a front end region 43a of the sewn seam 43 interposed there between. As to the circumferential wall 32, the area of the upper side wall 32a is folded inward on a valley-fold line CP extending in a transverse direction whereas the areas of the left side wall 32c and right side wall 32d are folded inward respectively on a pair of valley-fold lines CP2 and CP3 and on another pair of valley-fold lines CP4 and CP5 all of which fold lines extend in an anteroposterior direction, as shown in FIGS. 11 and 12. Each of the pairs of the fold lines is formed laterally symmetrical about the gas inlet port 35. The area of the preparatorily folded airbag 77 proximate the rear end 77b is folded inward on valley-fold lines CP6 and CP7 extending in a transverse direction. These fold lines CP6 and CP7 are formed laterally symmetrical about the gas inlet port 35 as well.

The preparatory folding is conducted as follows: Firstly, referring to FIG. 4, a portion UP located at the center in a transverse direction of the front end vicinity of the upper side wall 32a of the airbag 31 at full inflation (i.e. a region proximate a sewn seam of the lower part 46 of the first base cloth 45 and the front edges 50b of the second base cloths 50L and 50R) and a portion DP located at the center in a transverse direction of the rear end vicinity of the lower side wall 32b are gripped and pulled away from each other in an anteroposterior direction in such a manner as to form the fold lines CP2 and CP3 whereas the sewn seams 44L and 44R are gripped and opened toward the left and right relative to the sewn seam 43 in a flattening manner and during which the fold lines CP4 and CP5 are formed. Subsequently, the circumferential wall 32 is folded up in order to bring the preparatorily folded airbag 77 into shape, during which the fold lines CP1, CP6 and CP7 are formed. The portions UP and DP gripped to conduct the preparatory folding respectively form the front end 77a and rear end 77b of the preparatorily folded airbag 77. Referring to FIG. 24, a portion of the airbag 31 deployable at a lower side relative to the top plane 2 of the dashboard 1 at full inflation, namely a lower inflatable portion 31b, forms a generally ⅓ area at a side of the rear end of the preparatorily folded airbag 77 whereas a portion of the airbag 31 deployable at an upper side relative to the top plane 2 of the dashboard 1 at full inflation, namely an upper inflatable portion 31a, including the gas inlet port 35, forms a generally ⅔ area at a side of the front end of the preparatorily folded airbag 77 (also as referred to in FIG. 12).

Figure 15A:
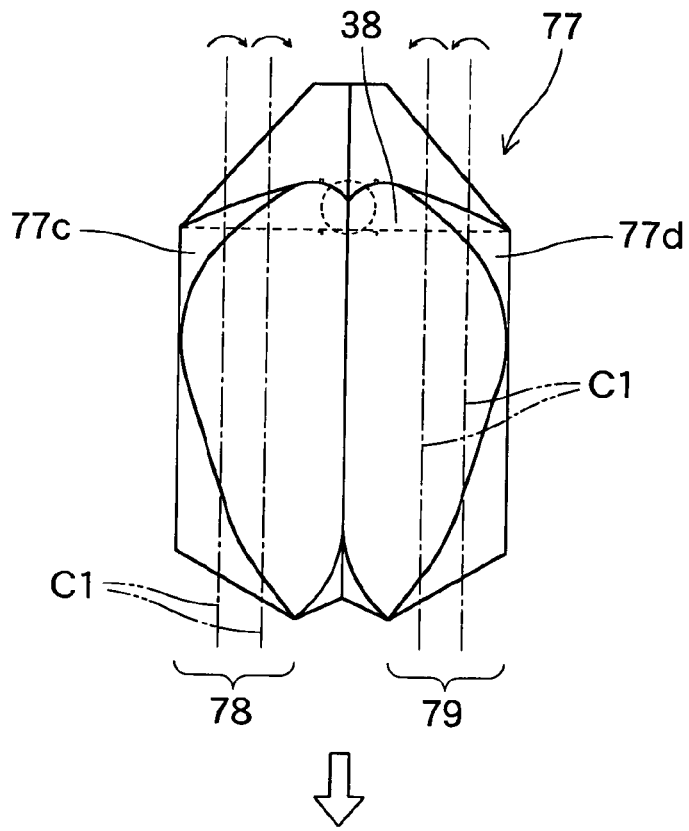
Figure 15B:
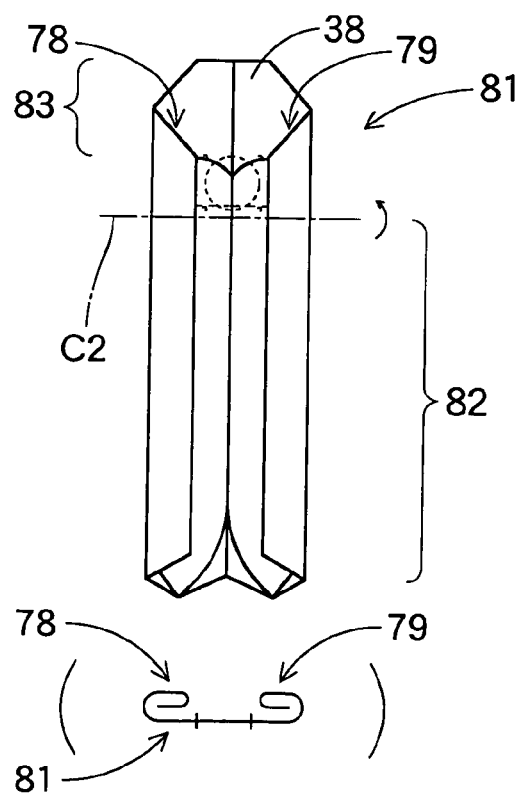
Figure 17A:
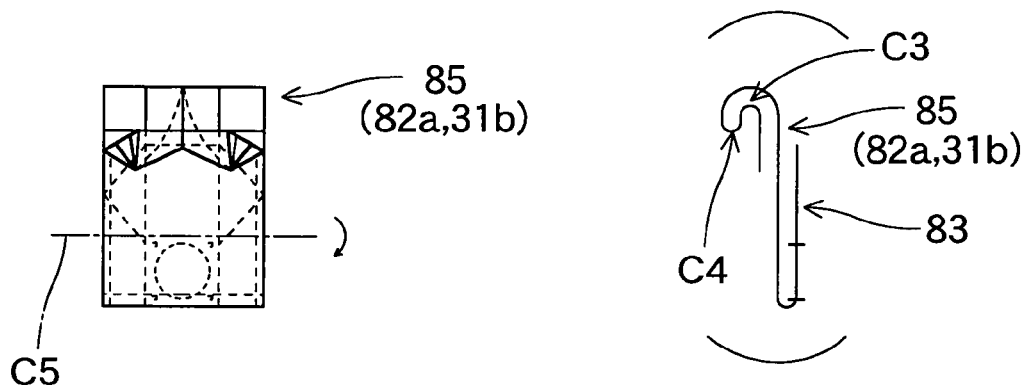
Figure 17B:
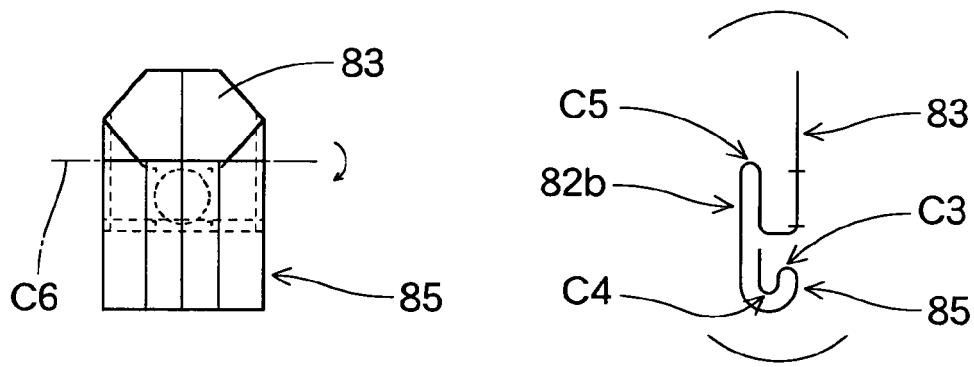
Figure 17C:
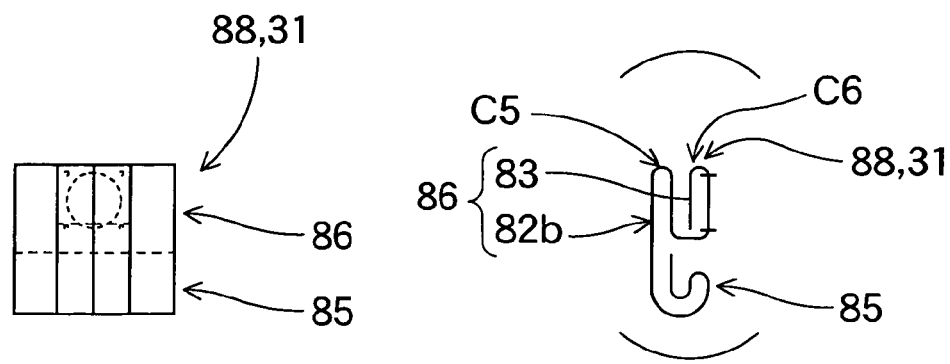

The preparatorily folded airbag 77 is contracted in a lateral width in the next lateral folding step. Specifically, referring to FIGS. 15A and 15B, a left region 78 and a right region 79 relative to the gas inlet port 35 in the preparatorily folded airbag 77 are rolled toward the rear side wall 38 from left and right edges 77c and 77d, respectively, while making fold lines C1 extending in an anteroposterior direction, thus forming a laterally contracted airbag 81 that is sized, in the lateral width, to fit into the case 13. Then the laterally contracted airbag 81 is contracted in an anteroposterior width in the next anteroposterior folding step. Specifically, referring to FIGS. 15B and 16A, a rear region 82 located at the rear of the gas inlet port 35 in the laterally contracted airbag 81 is folded back on the rear side wall 38 on a fold line C2 extending in a transverse direction at the rear periphery of the gas inlet port 35 so that the rear region 82 is placed over a front region 83 which is located in front of the gas inlet port 35. Subsequently, referring to FIGS. 16A and 16B, an end side region 82a of the rear region 82, which protrudes from the front region 83, is doubled on a fold line C3 extending in a transverse direction, and then this doubled region is doubled again as shown in FIGS. 16B and 17A on a fold line C4 extending in a transverse direction, thus providing the lower folded-up portion 85. That is, the end side region 82a of the rear region 82 forms the lower folded-up portion 85 and corresponds to the generally ⅓ area at a side of the rear end of the preparatorily folded airbag 77 described above, i.e. the lower inflatable portion 31b deployable below the top plane 2 of the dashboard 1 at full inflation of the airbag 31. Thereafter, as shown in FIGS. 17A and 17B, the rear region 82 including the lower folded-up portion 85 is folded back again on a fold line C5 extending in a transverse direction at the front periphery of the gas inlet port 35. Then as shown in FIGS. 17B and 17C, the front region 83 is folded on a crease C6 extending in a transverse direction at the front periphery of the inlet port 35 to be placed in between the rear region 82 and gas inlet port 35, thus providing the upper folded-up portion 86 and the folded-up body 88 of the airbag 31 that is contracted in the anteroposterior width to fit into the case 13. The upper folded-up portion 86 that is to be placed over the inflator 8 when the airbag 31 is housed inside the case 13 is formed of the front region 83 and a root side region 82b of the rear region 82 of the laterally contracted airbag 81.

Figure 18:
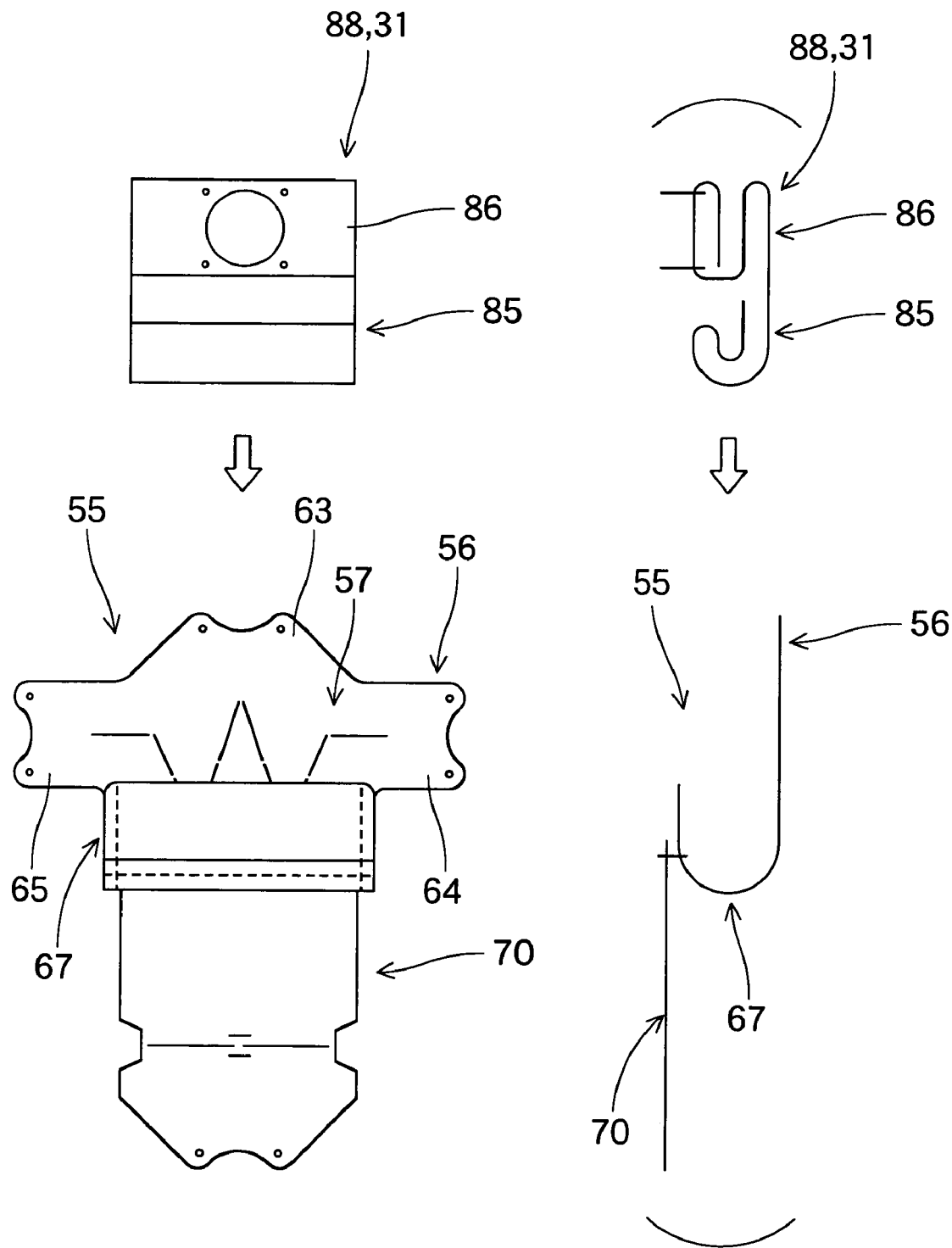
FIGS. 18, 19A, 19B, 20A and 20B illustrate the process of mounting the wrapping member of FIG. 8 around the folded-up body of the airbag shown in FIG. 17C.
Figure 19A:
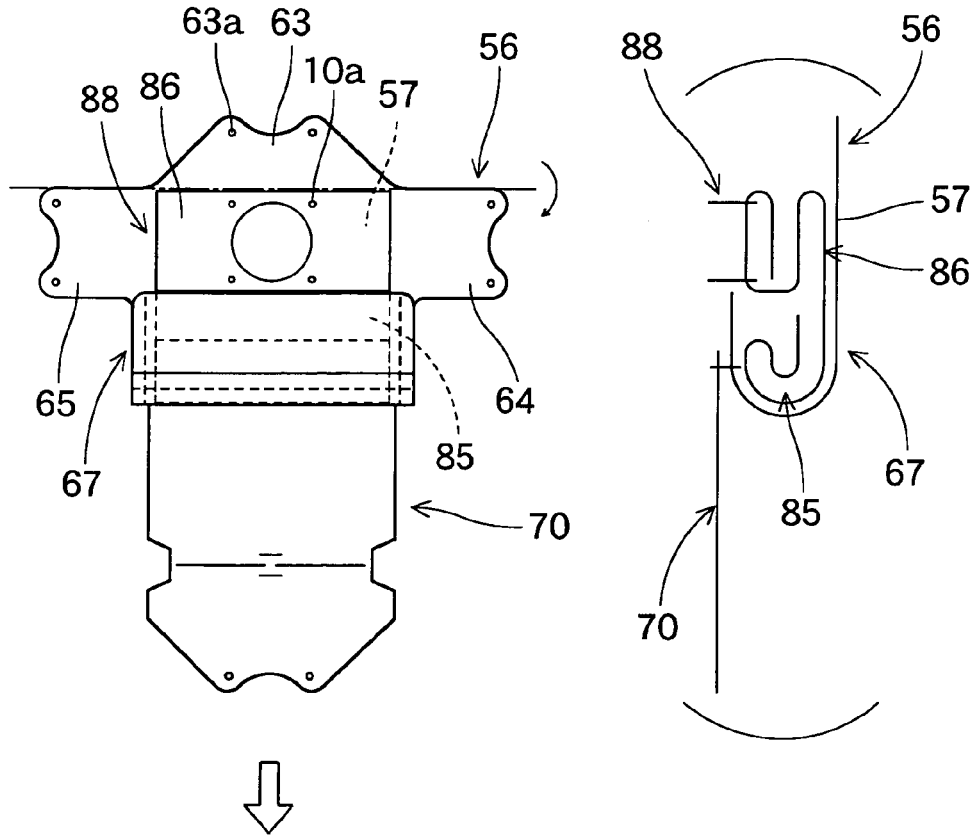
Figure 19B:
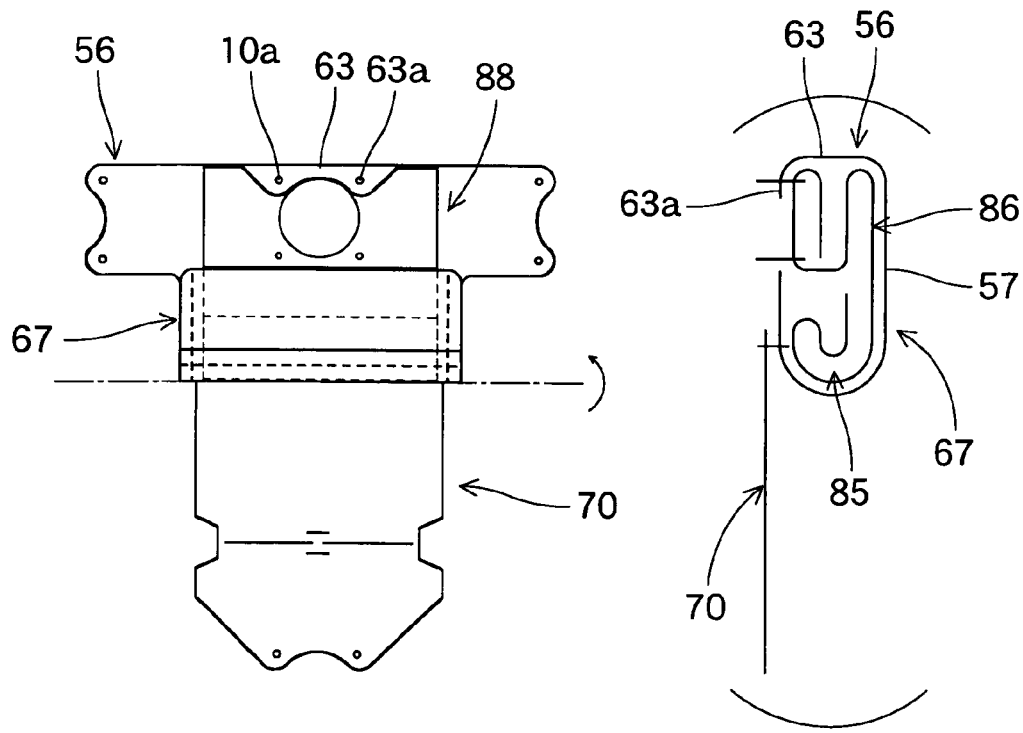
Figure 20A:
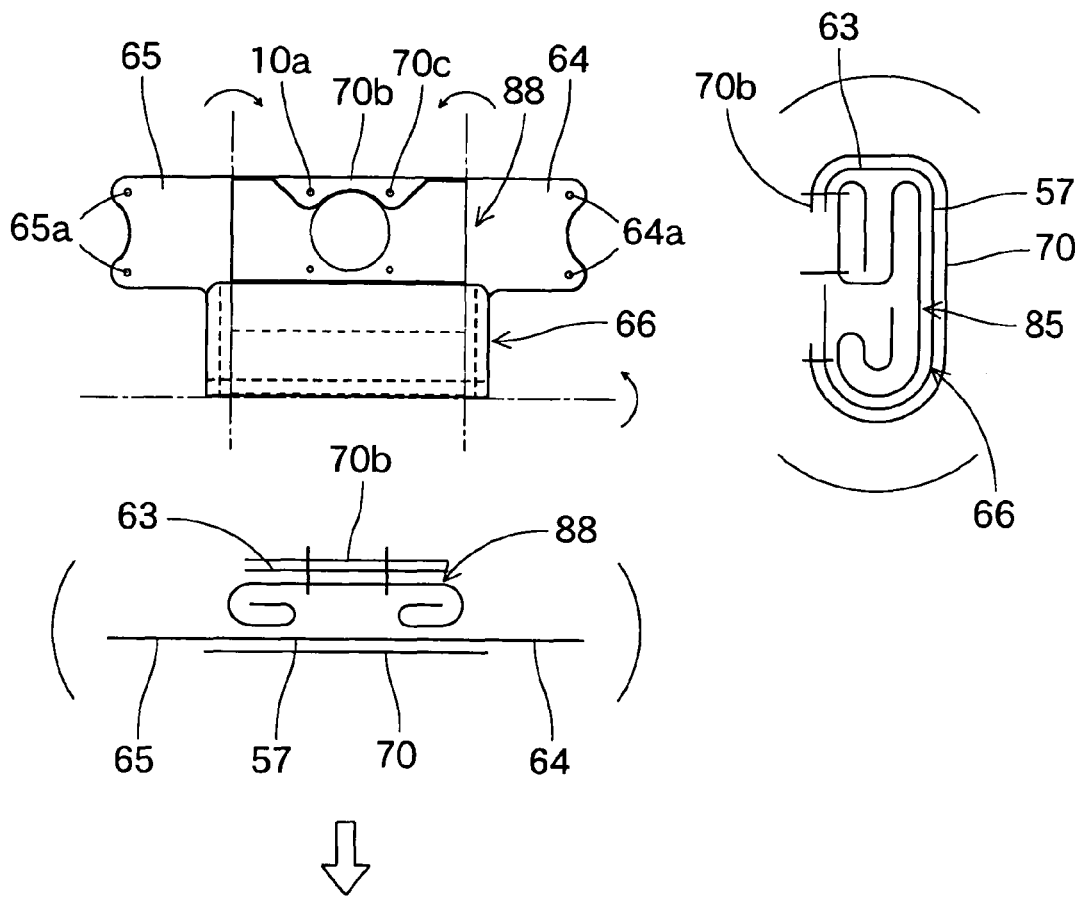
Figure 20B:
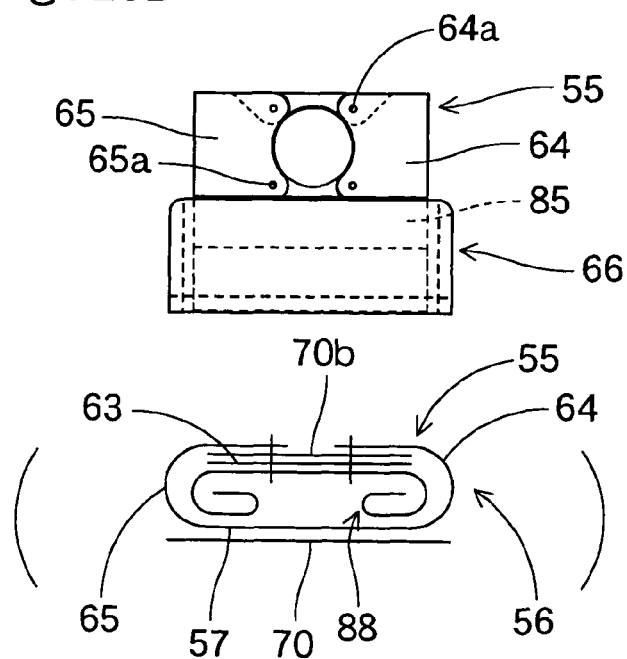

Thereafter, the wrapping member 55 is mounted on the folded-up body 88. Firstly, as shown in FIGS. 18, 19A and 19B, the lower folded-up portion 85 is housed in the bag portion 67 of the wrapping member 55 and the bolts 10a of the retainer 10 projecting from the folded-up body 88 are put into the mounting holes 63a formed on the front wall region 63 of the inner part 63 of the wrapping member 55, so that the ceiling wall region 57 covers the top plane of the folded-up body 88. Then as shown in FIG. 20A, the outer part 70 of the wrapping member 55 is wound around the outer circumference of the inner part 56 and the bolts 10a of the retainer 10 are put into the mounting holes 70c located proximate the leading end 70b of the outer part 70. Thereafter, as shown in FIG. 20B, the bolts 10b are put through the mounting holes 64a and 65a formed respectively on the left wall region 64 and right wall region 65 of the inner part 56, and thus the folded-up body 88 is wrapped up by the wrapping member 55.

Thereafter, the folded-up body 88 or airbag 31 is housed inside the case 13 by locating the lower folded-up portion 85 inside the rear storage area 28 and inserting the bolts 10a of the retainer 10 through the front floor 22 of the front storage area 26. At this time, the lower folded-up portion 85 is housed inside the rear storage area 28 such that the leading end 85a faces downward (i.e., toward the rear floor 23). Subsequently, the body 8a of the inflator 8 is set in the front storage area 26 from lower side of the front floor 22 via the insert hole 22a such that the bolts 10a projecting from the front floor 22 are put through the flange 8c of the inflator 8. Thereafter, by fastening the bolts 10a projecting from the flange 8c of the inflator 8 into the nuts 11, the folded-up airbag 31 and the inflator 8 are secured to the front floor 22 of the front storage area 26 in the case 13.

Then if the circumferential wall 15 of the case 13 is attached to the joint wall 6c of the airbag cover 6 in the dashboard 1 which had been mounted on a vehicle, and unillustrated brackets of the case 13 are secured to predetermined locations of the vehicle body, the airbag apparatus M for a front passenger's seat is mounted on vehicle.

In the event of a frontal collision of a vehicle equipped with the airbag apparatus M, inflation gas is discharged from the gas discharge ports 8b of the inflator 8 to inflate the airbag 31. When inflated, the airbag 31 breaks the tearable portions 58 and 72 of the wrapping member 55 and pushes and opens the doors 6a and 6b of the airbag cover 6 as shown in FIG. 24. Then the airbag 31 protrudes upward from the opening 13a of the case 13 provided by the opening of the doors 6a and 6b, and deploys rearward in such a manner as to fill up a space between the top plane 2 of the dashboard 1 and windshield 4 located above the dashboard 1. Thus the airbag 31 completes inflation as shown in FIGS. 1 and 24.

More specifically, in operation of the airbag apparatus M of this embodiment, when fed with inflation gas G from the inflator 8, the upper folded-up portion 86 of the airbag 31 housed above the inflator 8 inside the front storage area 26 of the case 13 (i.e. the upper inflatable portion 31a deployable above the top plane 2 of the dashboard 1) admits inflation gas G firstly, then unfurls and emerges from the opening 13a of the case 13. At this point, the lower folded-up portion 85 is suppressed from emerging from the opening 13a of the case 13 generally concurrently with the upper folded-up portion 86 (or upper inflatable portion 31a) since the lower folded-up portion 85 is housed in the rear storage area 28 that is deeper than the front storage area 26 by having the rear floor 23 located at a lower level than the mounting plane AF of the front storage area 26 and the left and right end regions 85b and 85c of the lower folded-up portion 85 are held down from above by the emergence restraining means RM. Therefore, as shown in FIGS. 22A, 22B, 23A and 23B, the lower folded-up portion 85 makes a delayed or late emergence from the opening 13a of the case 13 relative to the upper folded-up portion 86 (upper inflatable portion 31a).

Figure 25A:
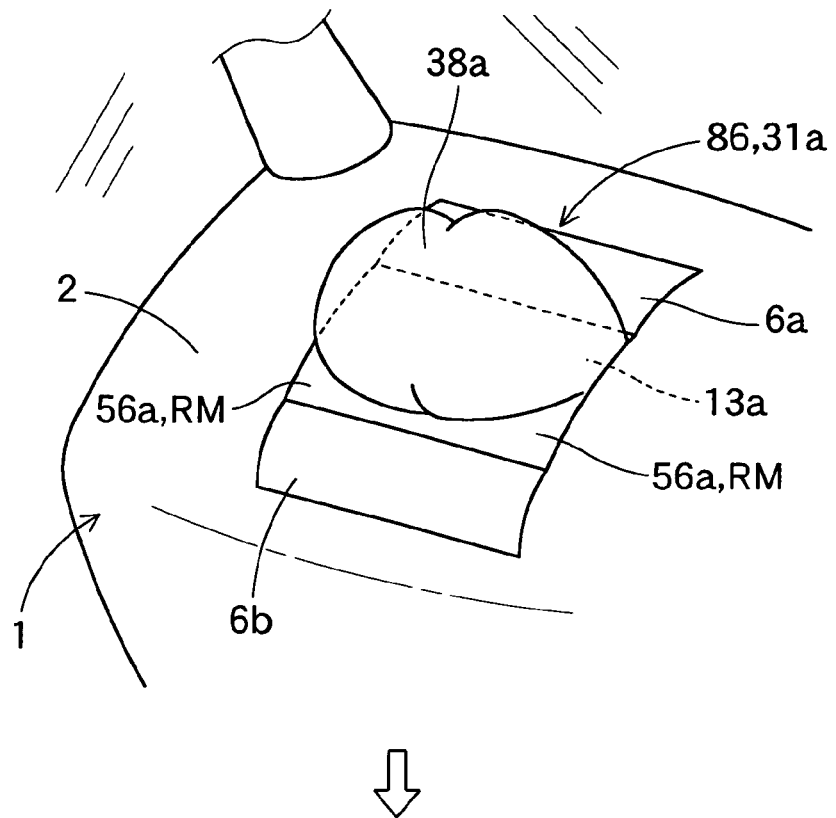
FIGS. 25A, 25B, 26A and 26B are schematic perspective views showing the behavior of the airbag at deployment.
Figure 25B:
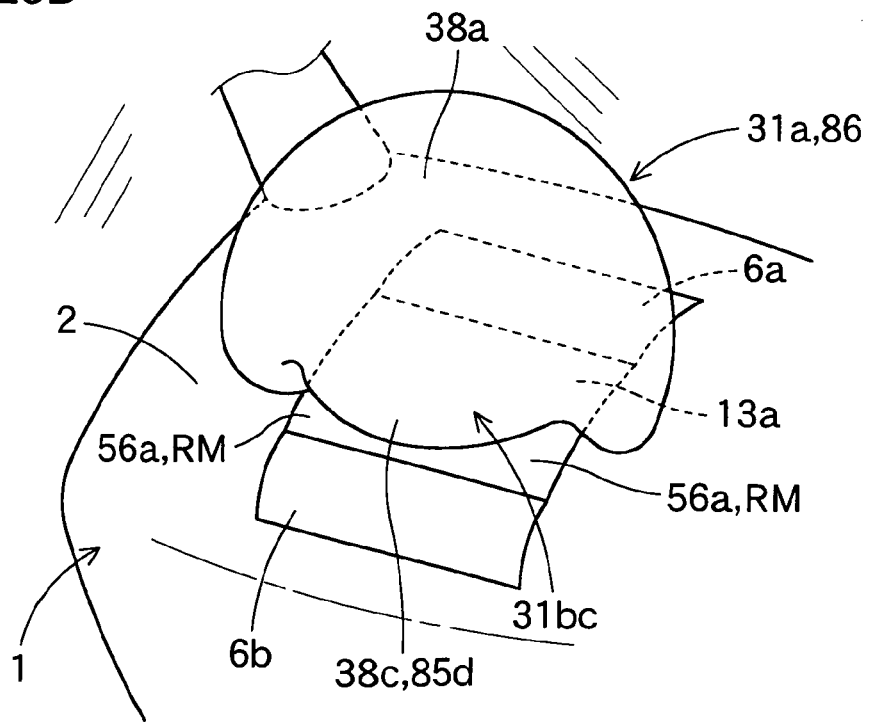
Figure 26A:
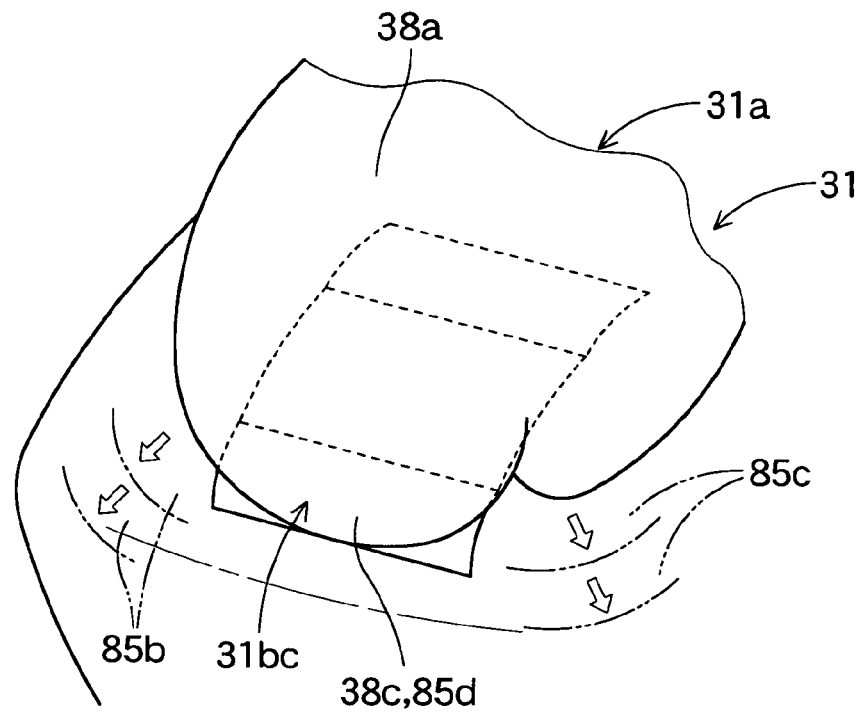
Figure 26B:
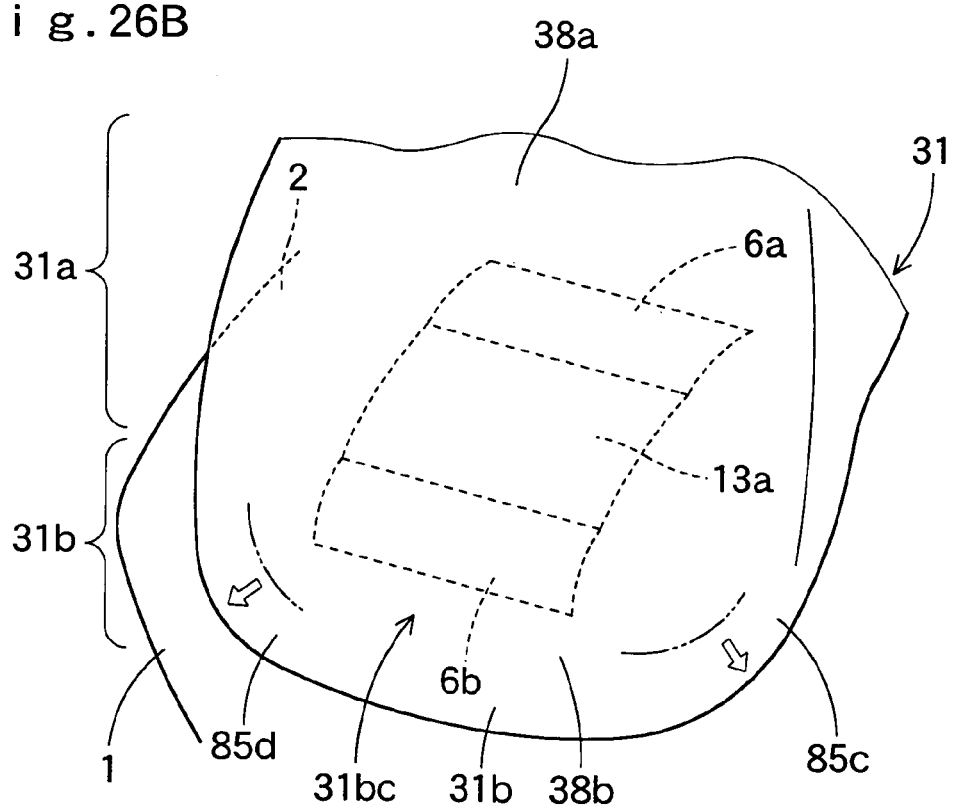

In this specific embodiment, since the lower folded-up portion 85 is housed inside the rear storage area 28 with the top planes of the left and right end regions 85b and 85c held down by the emergence restraining means RM, when the upper folded-up portion 86 emerges from the opening 13a of the case 13 and inflates such that an upper area 38a of the rear side wall 38 faces rearward, a central region 85d in a transverse direction of the lower folded-up portion 85 which is not held down by the emergence restraining means RM, i.e. a lower central area 38c that is a center in a transverse direction of a lower area of the rear side wall 38, which area 38c constitutes the lower inflatable portion 31b, deploys rearward from the opening 13a of the case 13 following the rearward movement of the upper area 38a of the rear side wall 38 which constitutes the upper inflatable portion 31a as shown in FIGS. 25A and 25B. As referred to FIG. 26A, subsequently, if a central region 31bc in a transverse direction of the lower inflatable portion 31b of the airbag 31 inflates in such a manner as to move the lower central area 38c of the rear side wall 38 rearward, the left and right end regions 85b and 85c of the lower folded-up portion 85, which had been held down by the emergence restraining means RM, emerge from the opening 13a of the case 13 and deploys. At this time, panels of areas of the airbag 31 having inflated to some extent, i.e. panels of the upper inflatable portion 31a and the central region 31bc in a transverse direction of the lower inflatable portion 31b (or the upper area 38a and lower central area 38c of the rear side wall 38) come to depress the left and right end regions 85b and 85c of the lower folded-up portion 85 that are emerging from the opening 13a of the case 13, such that the left and right end regions 85b and 85c of the lower folded-up portion 85 unfurls and deploys downward rather than rearward as indicated by double-dashed lines in FIG. 26B. Accordingly, the lower inflatable portion 31b deployable below the top plane 2 of the dashboard 1 deploys quickly downward, not rearward, in an early stage of deployment.

Therefore, the airbag apparatus M for a front passenger's seat of the invention can quickly deploy the inflatable portion 31b of the airbag 31 which is deployable below the top plane 2 of the dashboard 1 downward rather than upward in an early stage of airbag deployment.

The airbag apparatus M of the foregoing embodiment further includes the wrapping member 55 that wraps up the folded-up body 88 housed in the case 13 for keeping the folded-up configuration. The wrapping member 55 includes on the inner part 56 the bag portion 67 that houses the lower folded-up portion 85 and the tearable portion 58 that is tearable upon airbag deployment. The wrapping member 55 is mounted around the folded-up body 88 such that the tearable portion 58 is located immediately above the center in an anteroposterior direction of the front storage area 26 (i.e. immediately above the center line CL1) and forward of an upper side of the lower folded-up portion 85. The emergence restraining means RM is comprised of the region of the inner part 56 of the wrapping member 55 located at the rear of the tearable portion 58 (i.e. the cover regions 56a that range from the rear part 57b of the ceiling wall region 57 to the bag-forming region 66). That is, the airbag apparatus M utilizes the wrapping member 55 as the emergence restraining means RM as well, and thus saving the manufacturing cost in comparison with a case where a separate means or member is provided to act as the emergence restraining means. If such an advantage does not have to be considered, the emergence restraining means may also be formed by such members provided separate from the wrapping member as plate-like members that are formed proximate the opening of the case in such a manner as to extend from upper ends of left and right walls of the case.

The tearable portion 58 formed on the inner part 56 of the wrapping member 55 of the airbag apparatus M, when torn, forms an opening shaped like a rugby ball that is widest at the lateral center, as indicated by double-dashed lines in FIG. 21, by turning up a front part 57a and the rear part 57b of the ceiling wall region 57 that are located at the front and rear of the tearable portion 58. That is, after the tear of the tearable portion 58, the front edge of the rear part 57b of the ceiling wall region 57 located at the rear of the tearable portion 58 forms such an inclination that the center is located rearward whereas left and right ends are located forward, such that the rear part 57b has greater anteroposterior width measured from the rear edge (or the rear wall 19) of the case 13 at left and right edges 57c and 57d. Thus, when the upper folded-up portion 86 (or the upper inflatable portion 31a) emerges from the opening provided by the tear of the tearable portion 58, the regions ranging from the left and right edges 57c and 57d of the rear part 57b of the ceiling wall region 57 to the left and right edges 66c and 66d of the front end area of the bag-forming region 66, i.e., the cover regions 56a which are indicated by an area encircled by double-dashed lines in FIG. 21, hold top planes of the left and right end regions 85b and 85c of the lower folded-up portion 85 over a wide area in an anteroposterior direction. Furthermore, the cover regions 56a are formed of the regions that range from the left and right edges 57c and 57d of the rear part 57b of the ceiling wall region 57 to the left and right edges 66c and 66d of the front end area of the bag-forming region 66. In other words, the cover regions 56a are extensions of the bag portion 67 that houses the lower folded-up portion 85 thoroughly. Accordingly, even when the upper inflatable portion 31a of the airbag 31 moves upward, the cover regions 56a are pulled by the left and right edges 66c and 66d of the bag-forming region 66 that forms the bag portion 67 and thus is suppressed from moving upward in such a manner as to turn up end regions. Therefore, the cover regions 56a securely hold down the top planes of the left and right end regions 85b and 85c of the lower folded-up portion 85.

In the foregoing embodiment, the bag portion 67 of the wrapping member 55 is formed by folding back a base material or bag-forming portion 66 on a horizontal crease and coupling or sewing each of the left and right edges 66a and 66b together. That is, the bag portion 67 includes proximate the cover regions 56a acting as the emergence restraining means RM (i.e. proximate left and right edges of the cover regions 56a) the sewn seams 68. The sewn seams 68 act as reinforcement to prevent the cover regions 56a from being so deformed as to stretch upward, thus enabling the cover regions 56a to hold down the top planes of the left and right end regions 85b and 85c of the lower folded-up portion 85 securely.

The tearable portion 58 of the wrapping member 55 is configured to extend across the anteroposterior center line CL1 of the front storage area 26 that conforms to the center line CL2 that is drawn along a transverse direction on the anteroposterior center of the ceiling wall region 57 in a flattened state of the inner part 56, as shown in FIG. 21. This configuration provides, upon the tear of the tearable portion 58, a big opening OP1 (as indicated by double-dashed lines in FIG. 21) that is wide in an anteroposterior direction proximate the lateral center by opening areas of the inner part 56 of the wrapping member 55 around the tearable portion 58 (i.e. the front part 57a and rear part 57b of the ceiling wall region 57), thus allowing the upper folded-up portion 86 (or upper inflatable portion 31a) to emerge from the opening OP1 quickly.

The wrapping member 55 of the foregoing embodiment includes the outer part 70 other than the inner part 56 so as to doubly cover the folded-up body 88 of the airbag 31. However, the configuration of the wrapping member should not be limited thereby. The outer member 70 of the foregoing embodiment is merely provided to securely prevent the case 13 made of sheet metal from damaging the folded-up body 88 or airbag 31, and therefore, the wrapping member may be made of the inner part only as long as the base material to form the wrapping member has enough strength.

An alternative embodiment of the invention is now described and shown in FIG. 28. In this alternative embodiment, a tearable portion 58A is formed of a series of intermittent slits that extend straightly in a transverse direction immediately above the center line CL1 (CL2) on a wrapping member 55A. In the wrapping member 55A, although an opening OP2 provided by the tear of this tearable portion 58A is not so big in an anteroposterior direction as the opening OP1 of the wrapping member 55 shown in FIG. 21, an area of the wrapping member 55A around the tearable portion 58A, especially left and right end areas, act as a drag and thus enhancing the action of restraint of the emergence restraining means RM formed by the area at the rear of the tearable portion 58A. More specifically, as indicated by double-dashed lines in FIG. 28, the cover regions 56a of the wrapping member 55A, which act as the emergence restraining means RM, are greater in anteroposterior and lateral dimensions than those of the afore-described wrapping member 55. As a result, the wrapping member 55A further slightly delays the initiation of emergence of the lower folded-up portion 85 from the opening 13a of the case 13 in comparison with a case where the afore-described wrapping member 55 is employed.

Figure 22A:
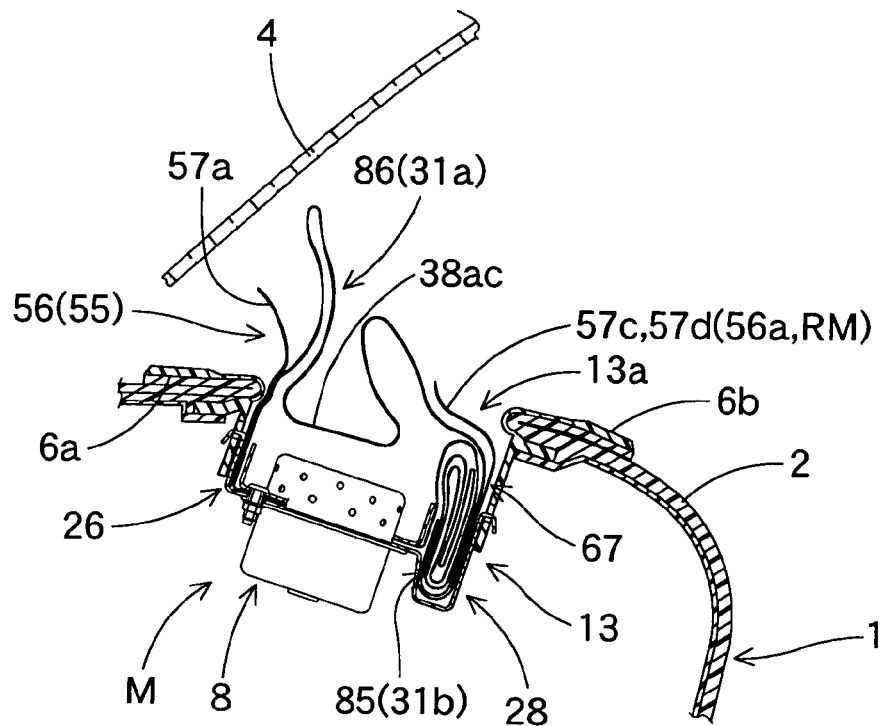
FIGS. 22A, 22B, 23A and 23B are schematic sections showing the behavior of the airbag at deployment.
Figure 22B:
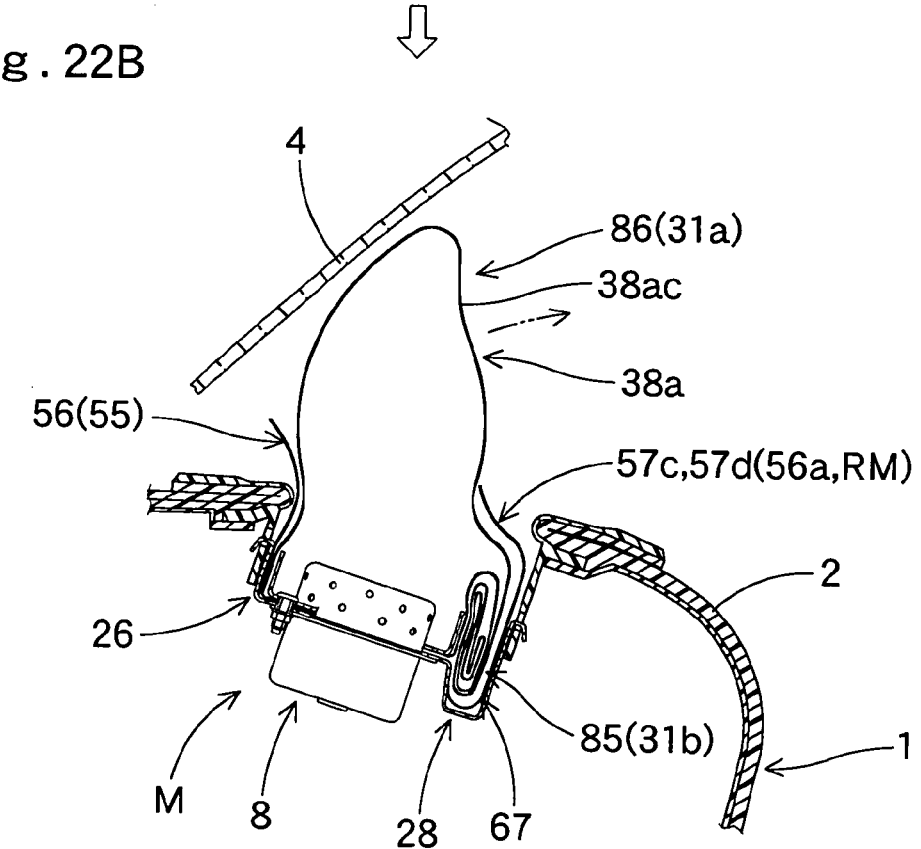

In the foregoing embodiments of the invention, the airbag 31 housed in the case 13 is folded up through the preparatory folding step, the lateral folding step that folds up to reduce the lateral dimension of the preparatorily folded airbag 77 to fit into the case 13 and the anteroposterior folding step that folds up to reduce the anteroposterior dimension of the laterally contracted airbag 81 to fit into the case 13. That is, the anteroposterior folding is applied to the airbag 31 that has been contracted in a transverse direction to fit into the case 13. This configuration can make the lateral dimension of all the folded-up bodies 88 uniform in comparison with a case where the lateral folding step is conducted after the anteroposterior folding step, and thus facilitating encasing of the folded-up bodies 88. Further, in the preparatory folding step, the circumferential wall 32 of the airbag 31 is folded up such that the laterally central region 38ac of the top area of the rear side wall 38 opposes the gas inlet port 35 in a vertical direction. With this configuration, in an initial stage of airbag inflation, the inflation gas discharged from the inflator 8 and passed through the gas inlet port 35 immediately pushes up the laterally central region 38ac of the top area of the rear side wall 38 as shown in FIGS. 22A and 22B, thus helping the upper folded-up portion 86 of the airbag 31 housed above the inflator 8 inside the front storage area 26 to emerge quickly from the opening 13a of the case 13.

Figure 23A:
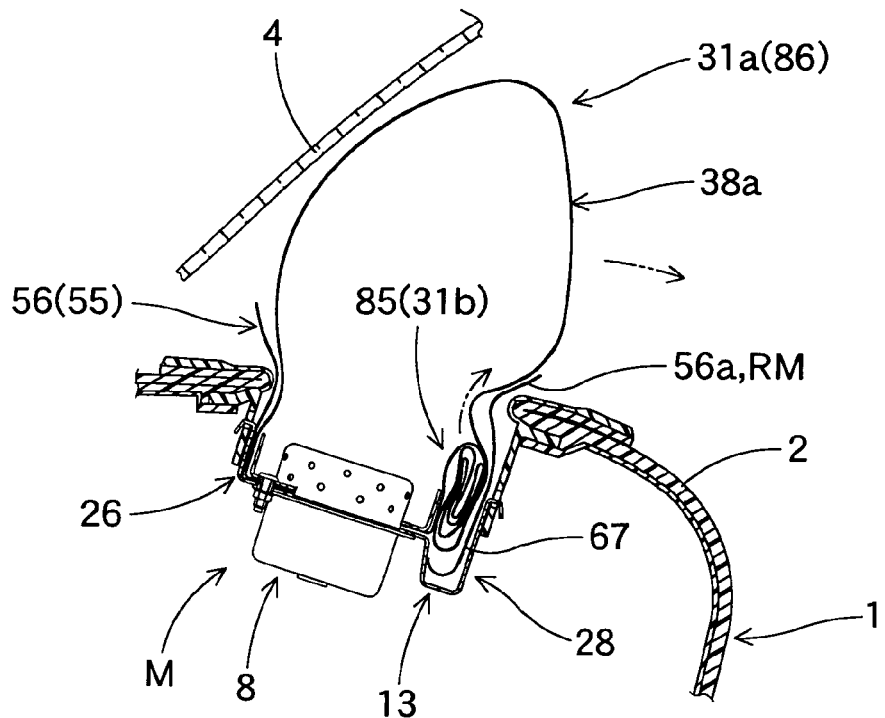
Figure 23B:
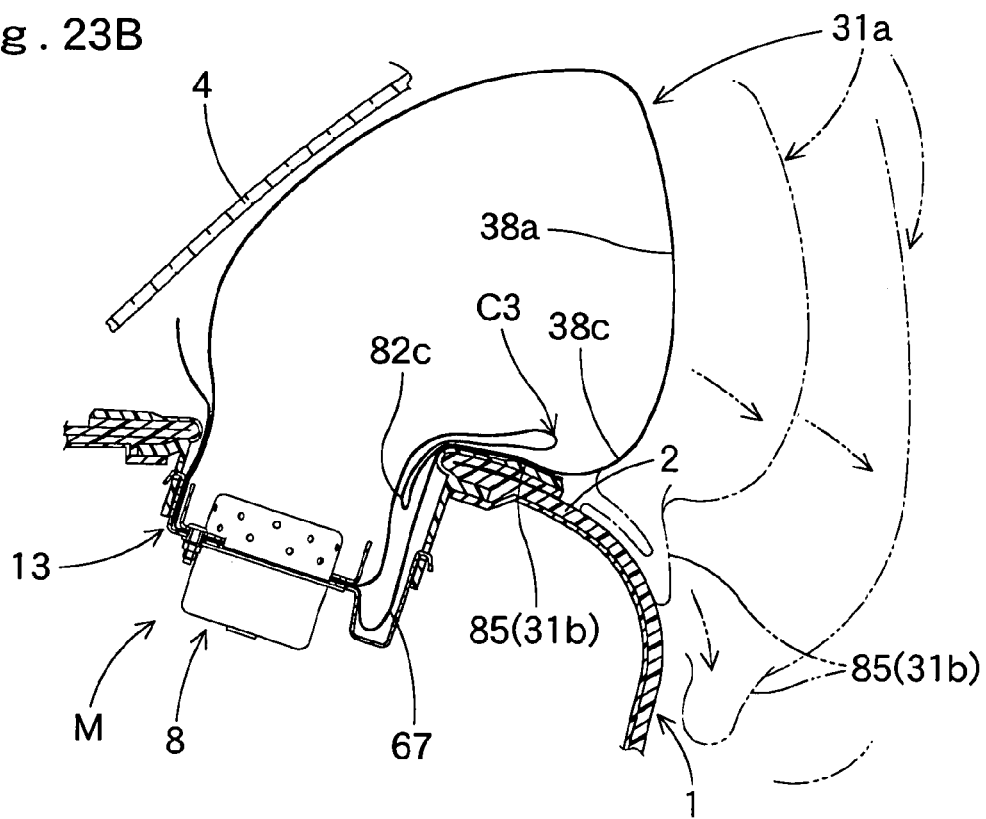

In the foregoing embodiments, the lower folded-up portion 85 is formed by doubling up the end side region 82a of the rear region 82 of the laterally contracted airbag 81 twice on the fold lines C3 and C4. Upon deployment of the airbag 31 thus folded up, the lower folded-up portion 85 firstly unfolds the fold line C4, and then a portion of the lower folded-up portion 85 located to the gas inlet port 35 from the fold line C3 admits inflation gas and inflates whereas a leading end portion of the lower folded-up portion 85 from the fold line C3 on is once pressed against the circumferential wall 15 (or the rear wall 19) of the case 13 or against the top plane 2 of the dashboard 1. Then if fed with further inflation gas, the lower folded-up portion 85 unfolds the fold line C3 and the whole lower folded-up portion 85 unfurls as shown in FIG. 23B. Therefore, the airbag apparatus M of the embodiment can delay the inflow of inflation gas into the portion proximate the leading end 82c of the rear region 82 of the laterally contracted airbag 81 that constitutes the lower folded-up portion 85 and help deploy the lower folded-up portion 85 downward securely.

In the airbag apparatus M of the embodiment, furthermore, the deployment angle of the lower folded-up portion 85 on the top plane 2 of the dashboard 1 can be adjusted by varying a level difference H between the levels of the rear floor 23 of the rear storage area 28 and the mounting plane AF (i.e. the front floor 22) of the front storage area 26.

FIGS. 27A and 27B respectively illustrate two cases 13A and 13B that have different level differences HA and HB between the rear floor 23A/23B and front floor 22A/22B (i.e. different depths of the rear storage area 28A/28B). The case 13A shown in FIG. 27A has such a rear storage area 28A that the level difference HA between the rear floor 23A and front floor 22A is great. This configuration forms the rear storage area 28A to have a relatively small anteroposterior dimension and to be further deeper relative to the front storage area 26A than in the afore-described embodiments, and thus further delaying the initiation of the emergence of the lower folded-up portion 85 from the opening of the case 13A. As a result, the lower folded-up portion 85 emerging from the case 13A is pressed down by the upper inflatable portion 31a and a rear central region 31c of the lower inflatable portion 31b of the airbag 31 that have already moved considerably rearward, so that the lower folded-up portion 85 deploys downward on the top plane 2 of the dashboard 1 at a great downward angle α relative to a horizontal direction. On the contrary, the case 13B shown in FIG. 27B has such a rear storage area 28B that the level difference HB between the rear floor 23B and front floor 22B is relatively small. This configuration forms the rear storage area 28B to have a relatively great anteroposterior dimension and to be shallow relative to the front storage area 26B, thus expediting the initiation of the emergence of the lower folded-up portion 85 from the opening of the case 13B. As a result, the lower folded-up portion 85 emerging from the case 13B is pressed down by the upper inflatable portion 31a and the rear central region 31c of the lower inflatable portion 31b of the airbag 31 that have moved relatively less rearward, so that the lower folded-up portion 85 deploys downward on the top plane 2 of the dashboard 1 at a relatively small downward angle β relative to a horizontal direction.

Such deployment angles α, β of the lower folded-up portion 85 can be suitably adjusted in accordance with the angle of the rear plane of the dashboard of a vehicle on which the airbag apparatus is to be mounted. By way of example, if the airbag apparatus is mounted on such a vehicle that the angle of the rear plane of the dashboard is great relative to a horizontal direction as viewed from a side, the level difference between the bottom wall of the rear storage area and the airbag mounting plane of the front storage area should be set large. This way the lower folded-up portion of the airbag deploys downward along the rear plane of the dashboard, rather than rearward.

What is claimed is:

1. An airbag apparatus for a front passenger's seat adapted to be mounted on an interior of a top plane of an instrument panel in front of a front passenger's seat of a vehicle, the apparatus comprising:
    a case including a bottom wall, a circumferential wall extending upward from a peripheral edge of the bottom wall in a cylindrical shape and an opening on top and thus having a generally open-top box shape, the case including a front storage area that has an airbag mounting plane and a rear storage area that is located at the rear of the front storage area and includes a rear bottom wall which is located at a lower level than the airbag mounting plane of the front storage area;
    an inflator stored in the front storage area of the case;
    a folded-up airbag inflatable with inflation gas and deployable upward and rearward in such a manner as to fill in a space between the top plane of the instrument panel and a windshield disposed above the instrument panel, the airbag, at full inflation, being formed into a generally square conical contour whose top is disposed at the front end of the airbag, the airbag including a rear side wall deployable generally vertically at the rear end of the airbag, a circumferential wall that extends forward from an outer peripheral edge of the rear side wall in a narrowing, conical fashion, a gas inlet port located at the vicinity of the front end of the airbag at full inflation and a peripheral area of the gas inlet port secured to the airbag mounting plane of the front storage area of the case, the airbag in a folded state including a lower folded-up portion that is formed by folding up a lower inflatable portion of the airbag deployable at a lower side relative to the top plane of the instrument panel and is housed in the rear storage area of the case and a general portion that is a portion of the airbag except the lower folded-up portion and is housed above the inflator inside the front storage area of the case; and
    means for restraining emergence of the lower folded-up portion of the airbag from the opening of the case in an early stage of airbag deployment by holding down top planes of left and right end regions of the lower folded-up portion, the means for restraining being located proximate left and right edges of the opening of the case in the rear storage area.

2. The airbag apparatus of claim 1 further comprising a wrapping member that wraps up the folded-up airbag thoroughly for keeping the folded-up configuration, the wrapping member including a bag portion that houses the lower folded-up portion wholly and a tearable portion that is tearable upon airbag deployment, the wrapping member being mounted around the folded-up airbag such that the tearable portion is located immediately above a center in an anteroposterior direction of the front storage area and forward of an upper side of the lower folded-up portion,
    wherein the means for restraining is comprised of a region of the wrapping member located at the rear of the tearable portion.

3. The airbag apparatus of claim 2 wherein the bag portion of the wrapping member is comprised of a base material that is folded back on a horizontal crease and coupled together at each of left and right edges.

4. The airbag apparatus of claim 2, wherein:

the tearable portion includes a plurality of straight slits that slit up the wrapping member; and the slits extend across a base line that runs in a transverse direction immediately above the center in an anteroposterior direction of the front storage area with adjacent ends of the slits located proximate to one another and thus forming a generally mountain shape as viewed from above.

5. The airbag apparatus of claim 2 wherein the tearable portion is formed of a series of intermittent slits that extend straightly in a transverse direction on the wrapping member.

6. The airbag apparatus of claim 1, wherein:

the airbag in a folded-up state includes:

a preparatory folding that flattens a generally whole area of the rear side wall and folds up the circumferential wall such that a top area of the rear side wall opposes the gas inlet port in a vertical direction;

a lateral folding that folds up the airbag subjected to the preparatory folding such that a lateral dimension of the airbag is reduced to fit into the case; and an anteroposterior folding that folds up the airbag subjected to the lateral folding such that an anteroposterior dimension of the airbag is reduced to fit into the case.

7. The airbag apparatus of claim 1, wherein a deployment angle of the lower folded-up portion on the top plane of the instrument panel is adjustable by varying a level difference between levels of the rear bottom wall of the rear storage area and the airbag mounting plane of the front storage area.

* * * * *